United States Patent [19]

Chu et al.

[11] 4,398,244
[45] Aug. 9, 1983

[54] INTERRUPTIBLE MICROPROGRAM SEQUENCING UNIT AND MICROPROGRAMMED APPARATUS UTILIZING SAME

[75] Inventors: Paul Chu, Sunnyvale; James B. Klingensmith, San Jose

[73] Assignee: Fairchild Camera & Instrument Corporation, Mountain View, Calif.

[21] Appl. No.: 147,100

[22] Filed: May 7, 1980

[51] Int. Cl.³ .............................................. G06F 9/22
[52] U.S. Cl. ................................................... 364/200
[58] Field of Search ... 364/200 MS File, 900 MS File; 5/451

[56] References Cited

U.S. PATENT DOCUMENTS

| | | | |
|---|---|---|---|
| 3,943,495 | 3/1976 | Garlic | 364/200 |
| 4,099,229 | 7/1978 | Kancler | 364/200 |
| 4,160,289 | 7/1979 | Bambara et al. | 364/200 |
| 4,161,778 | 7/1979 | Getson, Jr. et al. | 364/900 X |

Primary Examiner—Thomas M. Heckler

Attorney, Agent, or Firm—Kenneth Olsen; Michael J. Pollock; Theodore Scott Park

[57] ABSTRACT

An interruptible microprogram sequencing unit (MSU) for providing a sequence of microinstruction addresses to a control memory containing microinstructions for the operation of a microprogrammed apparatus. The MSU includes an address output for providing microinstruction addresses to the control memory, an address bus connected to the address output such that a plurality of microinstruction addresses applied to the address bus are sequentially provided to the address output, means connected to the address bus for applying the plurality of microinstruction addresses to the address bus, an interrupt return register operably connected to the address bus for receiving a microinstruction address from the address bus and storing the received microinstruction address, and means connected to the address bus for interrupting the sequence of microinstruction addresses and effecting storage of a microinstruction address on the address bus in the interrupt return register.

36 Claims, 39 Drawing Figures

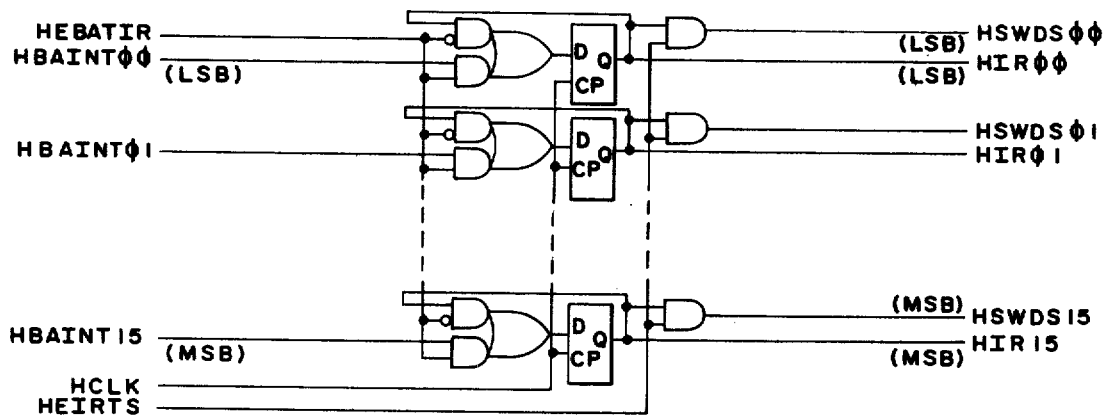
FIG. 5
FIG. 13
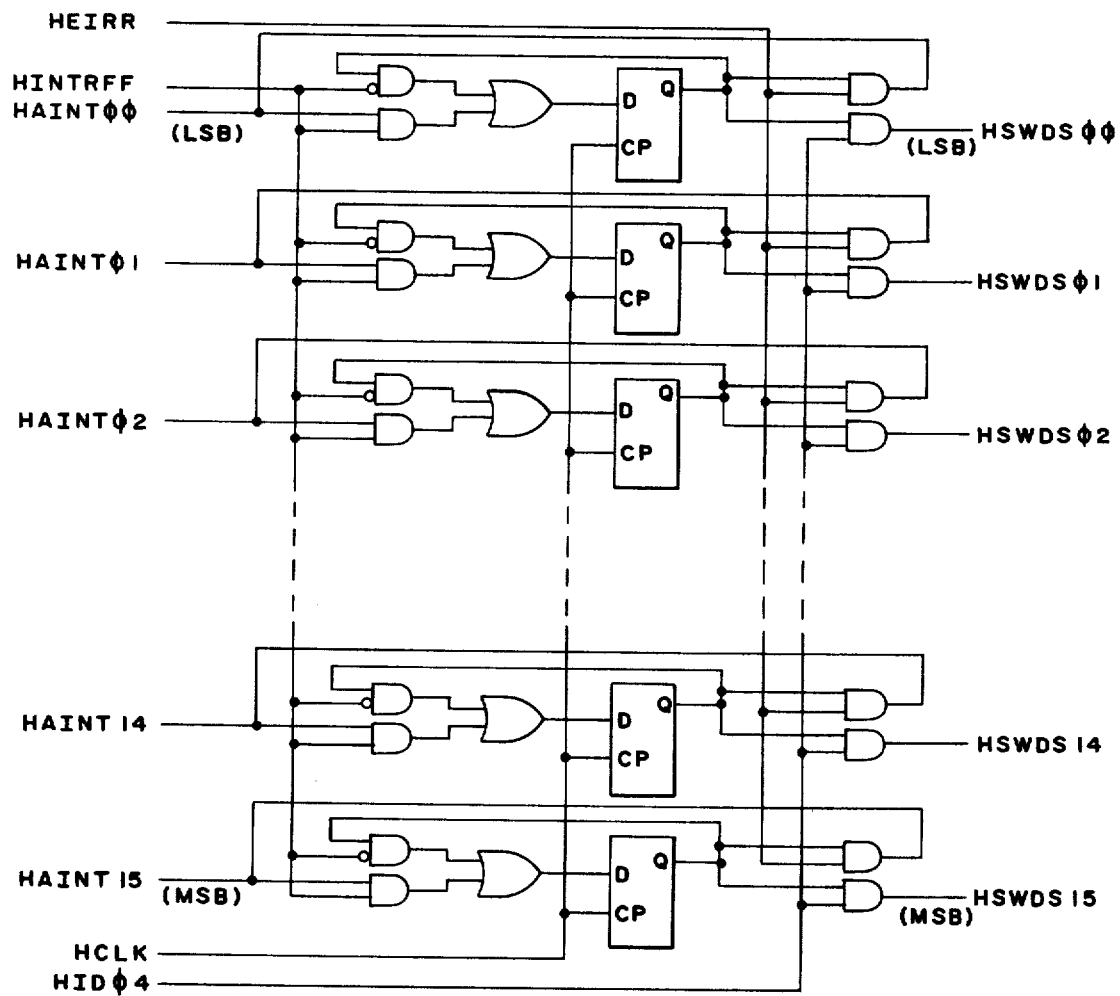

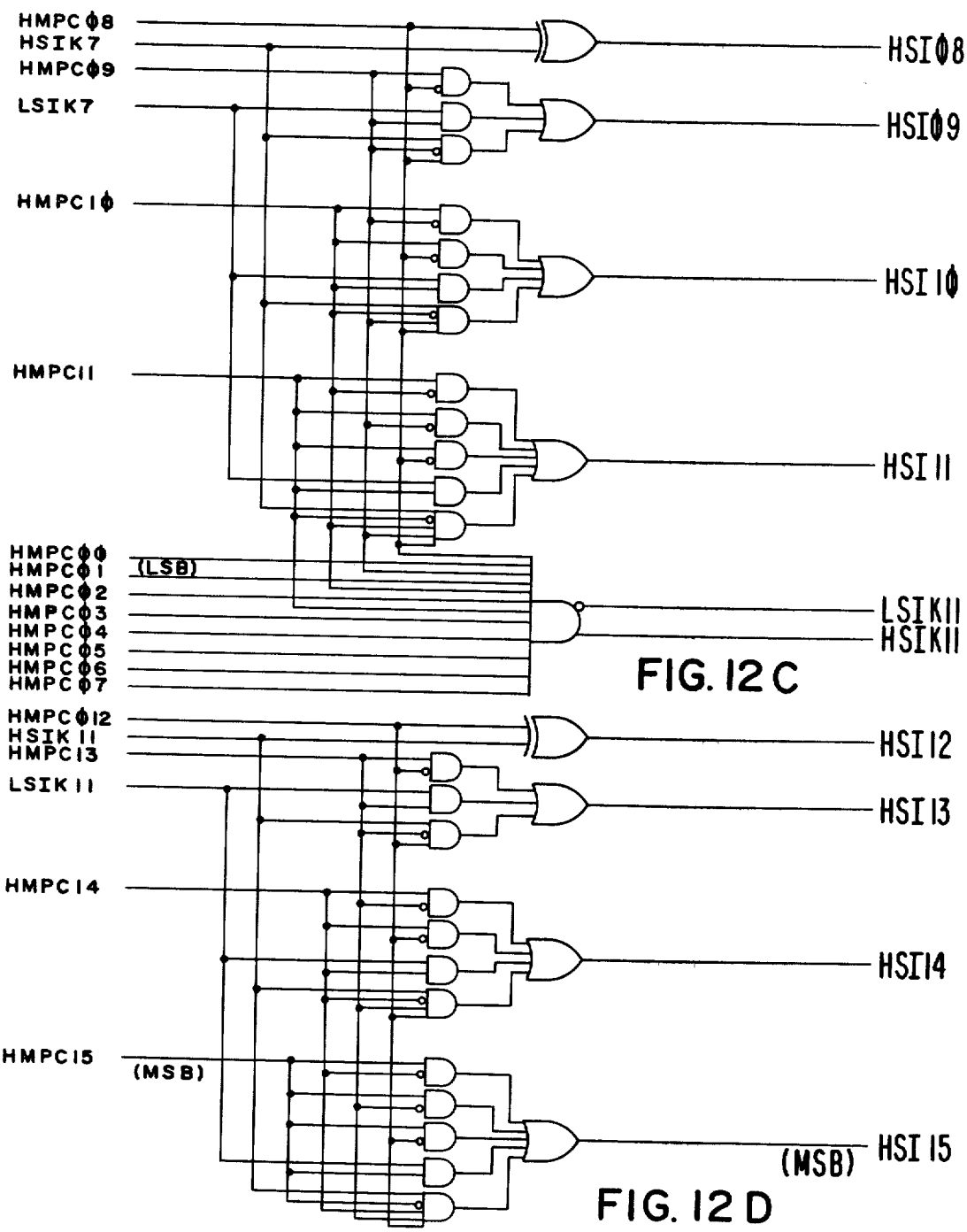
FIG. 12C
FIG. 12D
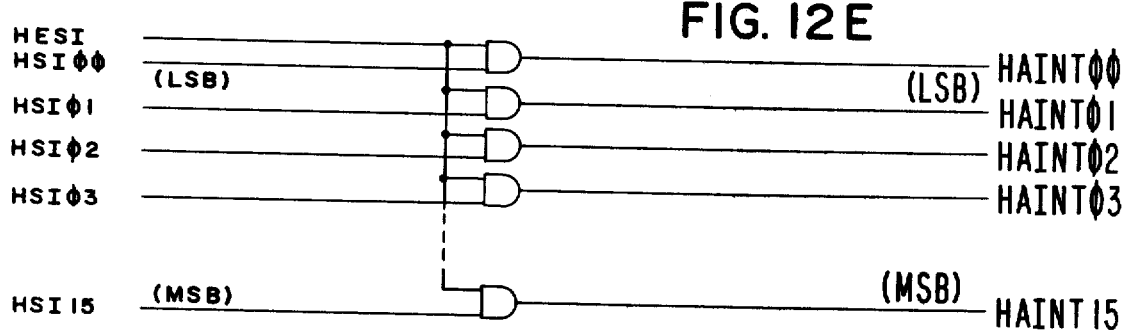
FIG. 12E

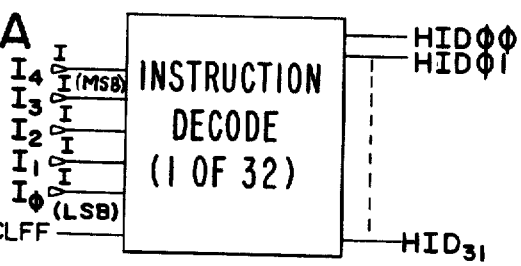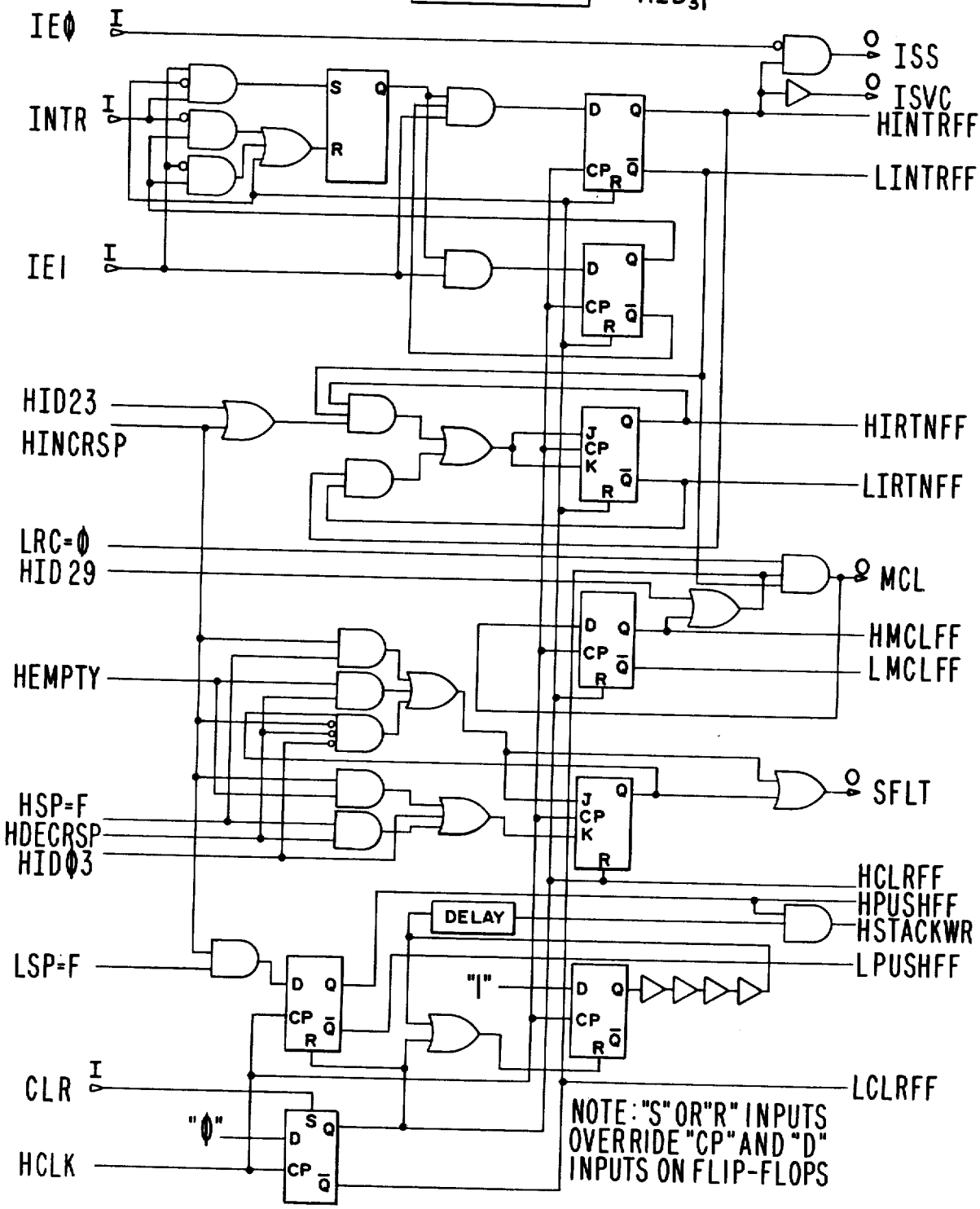

INTERRUPTIBLE MICROPROGRAM SEQUENCING UNIT AND MICROPROGRAMMED APPARATUS UTILIZING SAME

BACKGROUND OF THE INVENTION

1. Field of the Invention

This invention relates generally to digital apparatus, and more particularly the invention relates to microprogrammed apparatus and the sequencing of microprogram instructions for controlling the operation of microprogrammed apparatus.

2. Discussion of the Prior Art

In digital apparatus such as the arithmetic logic unit (ALU) of a digital computer, a number of data paths are available for operating on data in accordance with program instructions. Control of the data paths can be effected by hard wired random logic for each instruction, or the control can be effected by a microprogram for each instruction. A microprogram consists of a plurality of microinstructions with each microinstruction controlling data paths in the digital apparatus. The microinstructions are stored in a control memory, and a microprogram sequencer responds to program instructions or macroinstructions and sequentially addresses the microinstructions necessary for implementing each macroinstruction.

The development of high speed, bipolar VLSI microprogrammable building blocks has brought microprogrammed machine design to a new level of performance. The more recent developments have emphasized the data path section of the machine, such as faster ALU's scratch pad registers, and random access memory (RAM) files. However, to fully utilize the processing power of the data path a corresponding improvement in the control section of the machine is required. Thus, the control element including the microprogram sequencer and microprogram memory has now become a critical element in determining overall machine cycle time.

Many improvements have been made in the control memory including the provision of higher density devices, faster access time, the incorporation of pipeline registers, and the like. This has led to a savings in component interconnects, loading and propagation delays, and therefore to higher system performance.

However, the intelligent element of a control section, the microprogram sequencer, has largely been neglected with respect to performance. Its basic function, to provide the order in which microinstructions are fetched from control memory, has been emphasized while neglecting the decision making functions based on instructions and/or external conditions as well as the ability to handle interrupts including the ability to provide storage for saving and returning to various states of execution.

SUMMARY OF THE INVENTION

Accordingly, an object of the present invention is an improved microprogrammed apparatus.

Another object of the invention is a microprogrammed apparatus including microprogram sequence unit having improved flexibility.

Still another object of the invention is a microprogram sequencing unit which can be interrupted during the execution of a microprogram.

Yet another object of the invention is an interruptible microprogram sequencer with micro-subroutine nesting capabilities.

Another object of the invention is an interruptible microprogram sequencing unit with expanded memory addressing capabilities.

Still another object of the invention is a microprogram sequencing unit for automatically generating successive addresses for assisting in the loading of writable control memory.

Another object of the invention is an interruptible microprogram sequencing unit in which contents of internal registers can be saved and restored during an interrupt.

Yet another object of the invention is a microprogram sequencing unit with branch address offset capabilities.

Briefly, in accordance with the present invention a microprogram apparatus includes a plurality of data paths for manipulating data, a control memory for addressably storing a plurality of microinstructions for controlling data paths, and an interruptible microprogram sequencing unit for sequentially providing addresses to microinstructions in the control memory.

More particularly, the interruptible microprogram sequencing unit includes an address output, an address bus connected to the address output, means for applying externally supplied addresses to the bus, an interrupt return register operably connected for supplying an address on the bus, and means for interrupting the instruction address sequence and effecting storage of an address on the bus in the interrupt return register.

The interruptible microprogram sequencing unit preferably includes first address incrementing means including a microprogram counter register and operably connected to the bus for incrementing addresses. A multilevel storage means is operably connected with the bus, the first address incrementing means, and the interrupt return register for storing return addresses in response to multiple interrupts. The multilevel storage means preferably includes status means for indicating overflow and underflow conditions.

In addition, a second address incrementing means may be connected with the first address incrementing means and with the bus for providing a skip address. A repeat address register may be operably connected with the bus to store and repeat an address on the bus.

The means for applying externally supplied addresses to the bus may include an interrupt register for storing externally supplied addresses and operably connected to provide a stored address to the bus, whereby an interrupt address can be provided from the interrupt register or directly from an external address source.

In accordance with another feature of the invention a register/counter means is provided for storing an address or for storing a decrementable count with the register/counter means including means for indicating a zero count. A sequence of microinstructions can be addressed by loading a start address in the first address incrementing means, loading a count in the register/counter means, and incrementing the address until the register/counter decrements to a zero count. The register/counter can also be used to set up loop and repeat counts.

In accordance with still another feature of the invention multiplexer means is provided for selectively connecting the means for supplying externally supplied addresses, the interrupt register, and the register/counter means to the address bus. The multiplexer means is also connected to the multilevel storage means for storing addresses from the multiplexer means in the multilevel storage means. The multilevel storage means is connected back to the interrupt register and to the register/counter for restoring addresses, counts, or to direct stack contents to the address port.

In accordance with another object of the invention multiway input means and multiplexer means are provided which are responsive to source control field inputs for applying an address, with or without offset, to the bus.

BRIEF DESCRIPTION OF THE DRAWINGS

The invention and objects and features thereof will be more readily apparent from the following detailed description and appended claims when taken with the drawing, in which:

FIG. 5 is a schematic of one embodiment of an interrupt register.

FIGS. 12A–12E are schematics of one embodiment of a skip incrementer.

FIG. 13 is a schematic of one embodiment of an interrupt return register.

FIGS. 20A–20F are schematic of one embodiment of control logic.

DETAILED DESCRIPTION OF THE PREFERRED EMBODIMENT

Figure 1:
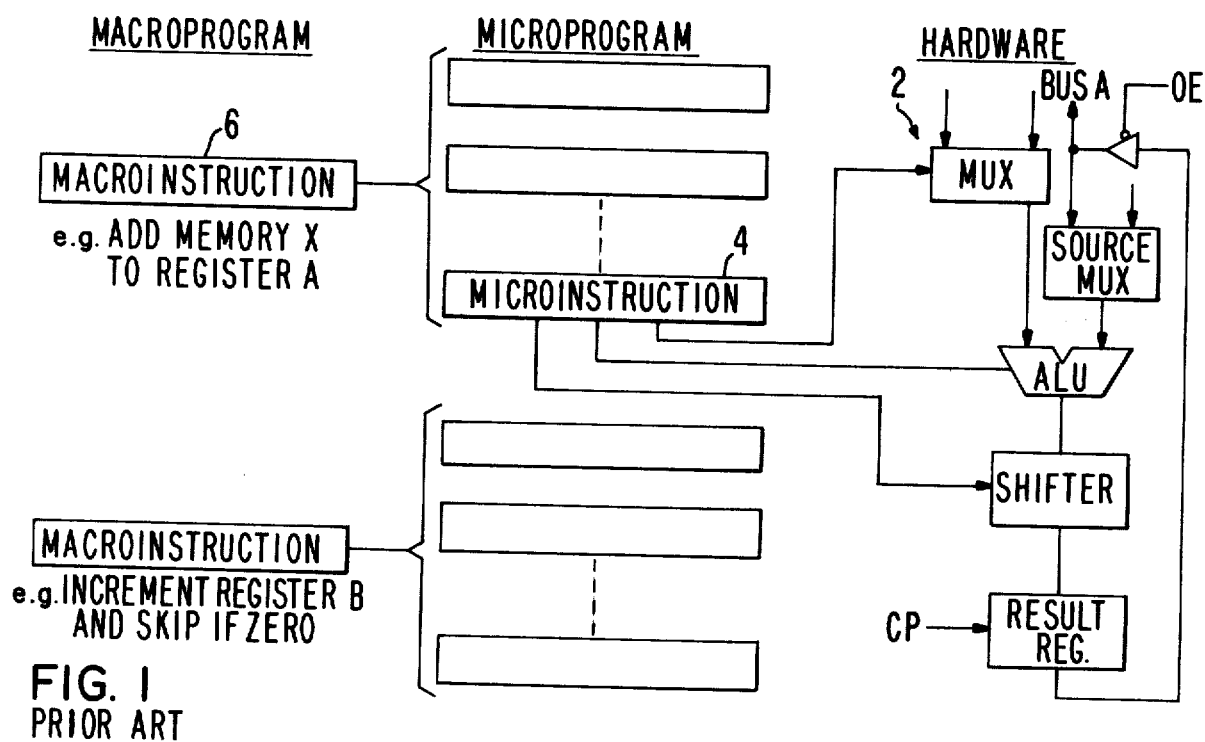
FIG. 1 is a schematic illustrating the operation and control of microprogrammed apparatus.

Referring now to the drawings, FIG. 1 is a simplified schematic illustrating the operation of a prior art microprogrammed apparatus. The apparatus shown generally at 2 comprises a plurality of data paths including such elements as multiplexers, arithmetic logic units, shifters, and the like, which can be controlled by the bits of a microinstruction 4. A plurality of microinstructions comprise a microprogram which is called by a macroinstruction 6 to implement a desired operation such as, for example, adding to a register from memory or incrementing data stored in a register and skip if result is zero.

Figure 2:
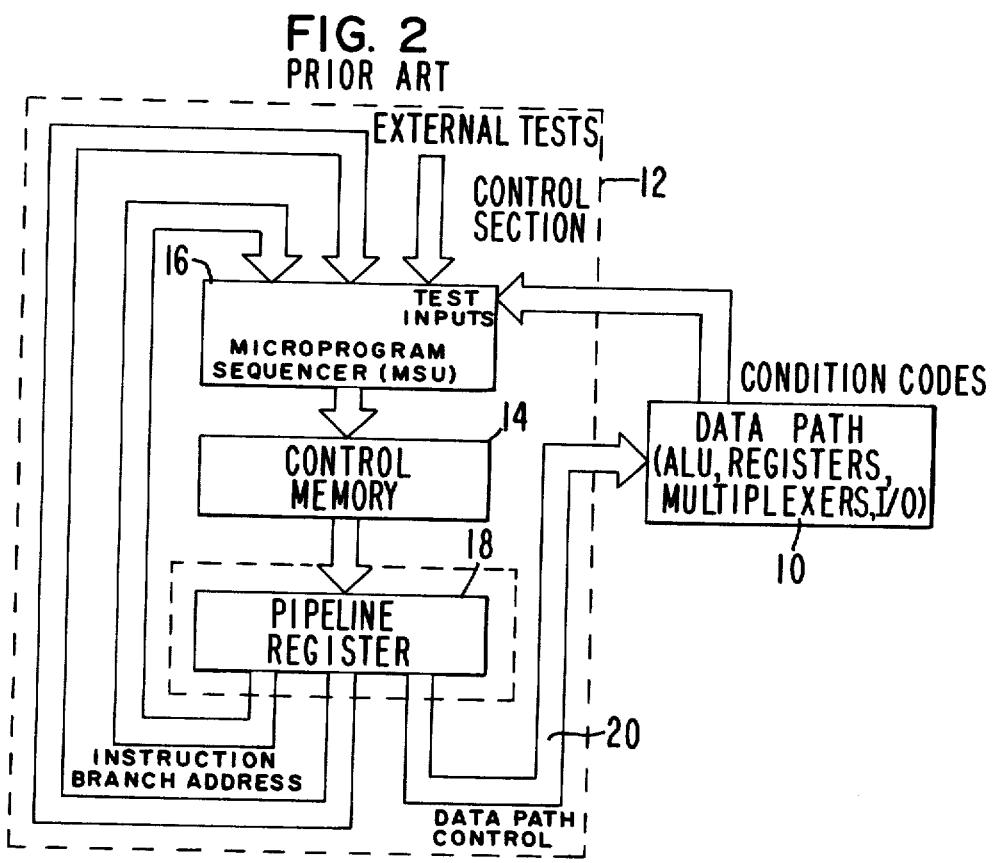
FIG. 2 is a generalized functional block diagram of a microprogrammed apparatus.

Fig. 2 is a generalized functional block diagram of a prior art microprogrammed apparatus which further illustrates the sequencing of microinstructions implementing a microprogram in response to macroinstructions. The microinstructions are provided to the data path 10 from the control section shown generally at 12. The control section 12 includes a control memory 14 in which the microinstructions are stored and a microprogram sequencer 16 which sequentially addresses the microinstructions in control memory 14 for implementing a macroinstruction. As each microinstruction in the control memory 14 is addressed, the microinstruction is fed to a pipeline register 18. In conventional microprogrammed apparatus the pipeline register 18 provides th current microinstruction through a data path control 20 to the data path 10, and the pipeline register also provides branch addresses and instructions back to the microprogram sequencer 16. The microprogram sequencer 16 responds to this input along with external tests and condition codes from the data path 10 to establish the next microinstruction address for the control memory 14.

As above described, while improvements have been made in the building blocks for the data paths and in the control memory, improvements in the microprogram sequencer have not kept pace with the other improvements. For example, conventional microprogram sequencers do not have the ability to respond to an asynchronous external event to provide an interrupt at the microinstruction level. Currently, the occurrence of asynchronous events must be periodically tested with interrupts occurring at the macroinstruction level. Particularly with single semiconductor chip sequencers the maximum addressing range is severely limited; for additional addressing capability designers have had to rely upon the use of external logic for implementing paging schemes. Additionally, branch address field sharing is not readily incorporated in current microprogram sequencing units.

These limitations are overcome in the microprogram sequencing unit in accordance with the present invention. Other advantages of the unit will become apparent from the following description.

MICROPROGRAM SEQUENCING UNIT (MSU)

Figure 3:
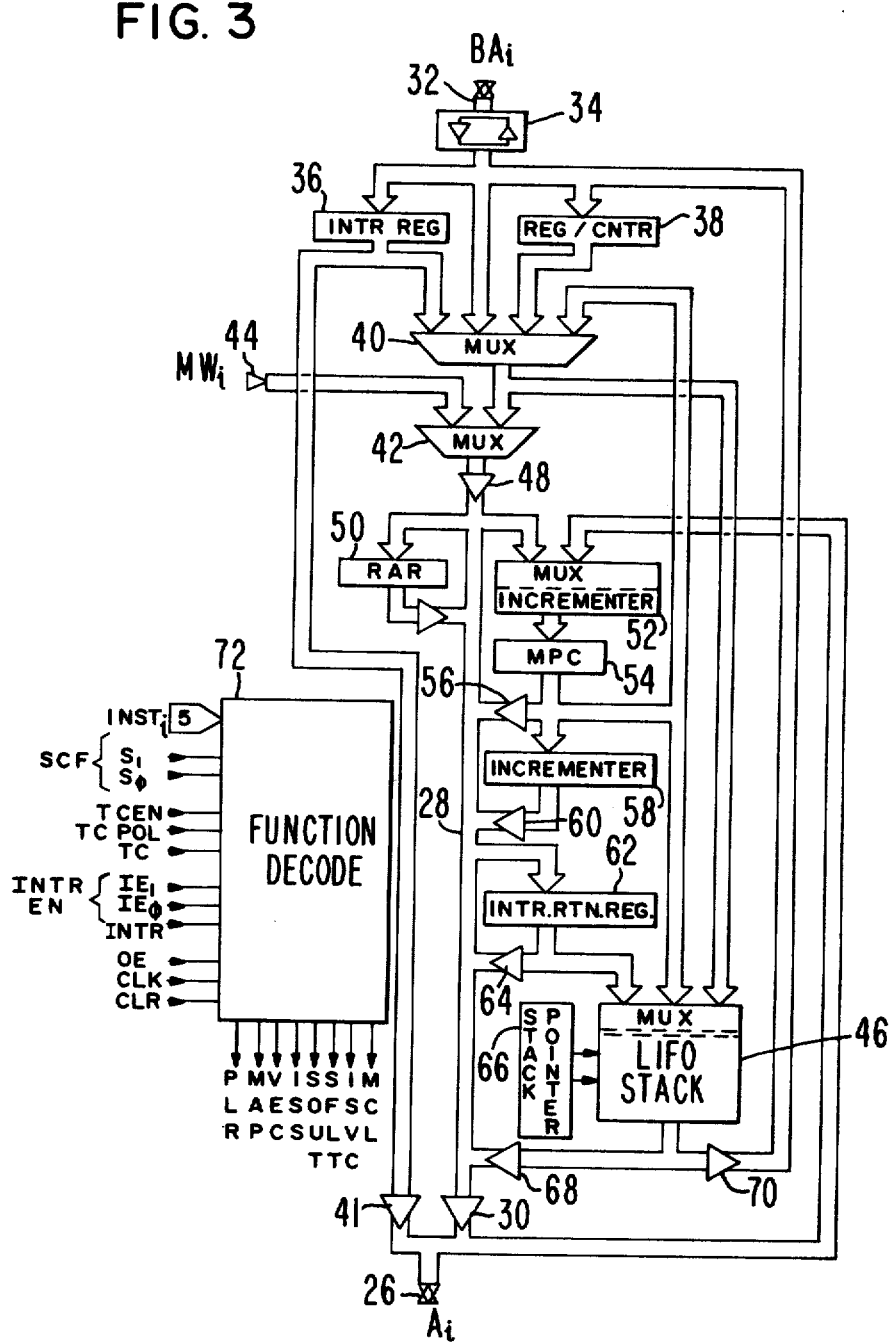
FIG. 3 is a functional block diagram of one embodiment of an interruptible microprogram sequencing unit in accordance with the present invention.

FIG. 3 is a functional block diagram of one embodiment of a microprogram sequencing unit (MSU) in accordance with the present invention. The device can be embodied in a single semiconductor chip and package. The MSU includes a 16 bit output ($A_i$) 26 for addressing a microinstruction in the control memory. An address bus ($A_{int}$) 28 is connected to the output 26 by a buffer 30. Externally supplied through branch addresses (BA) are provided to the MSU through a 16 bit bidirectional port 32. Port 32 is connected through bidirectional buffer 34 to an interrupt register 36, a register/counter 38, and directly to a multiplexer 40 along with the outputs of interrupt register 36 and register/counter 38. The interrupt register 36 is also connected directly to output 26 through buffer 41.

The output of multiplexer 40 is applied to a multiplexer 42 along with a four bit multiway (MW) input 44.

The output of multiplexer 40 is also provided to a multi-level stack 46 for address storing. Multiplexer 42 is connected through a buffer 48 to the address bus 28.

Addresses on bus 28 can be sourced from a number of sources through multiplexers 40 and 42. In addition, a repeat address register (RAR) 50 is provided for storing and repeating an address on the bus 28. Addresses on bus 28 are incremented by incrementer 52 and stored in the microprogram counter (MPC) 54 during a fetch operation. The next address for a fetch operation is provided by MPC 54 through buffer 56 to bus 28. A second incrementer 58 is connected to MPC 54 to provide a skip function. The output of incrementer 58 is connected through a buffer 60 to bus 28.

An interrupt return register 62 is connected to bus 28 for storing a return address during an interrupt period. The output of the interrupt return register 62 is connected through buffer 64 for returning an address to bus 28, and register 62 is connected to the multilevel storage stack 46.

As will be described further hereinbelow, register contents can be stored in the multilevel stack 46 and later restored. The stack is a last in-first out (LIFO) memory with a stack pointer 66 pointing to a storage location and also for indicating an overflow or underflow condition. The output of stack 46 is connected through buffer 68 to the bus 28 and through buffer 70 and buffer 34 for unloading to an external memory, and the stack output is connected to interrupt register 36 and register/counter 38 for restoring the same.

The MSU further includes function decode logic 72 having 16 input lines and 8 output lines for signalling external address sources and providing status. Five of the inputs define thirty-two instructions, and other inputs allow the MSU to conditionally respond to the instruction.

The bus organization of the MSU minimizes hardware, interconnection and propagation delays. The address outputs ($A_i$) 26 can be sourced from the interrupt register 36, the internal address bus ($A_{int}$) 28, or externally supplied by a user through input port 32. In addition, the user can deactivate the output enable (OE) and supply an address directly to the address outputs ($A_i$) 26. The bus 28 has various possible sources including a branch address (BA) from input port 32, the register/counter 38, the interrupt register 36, the microprogram counter 54. Further, each of these sources can be used in conjunction with the four multiway inputs 44 for N-way branching. In addition, other sources for the bus 28 are the repeat address register 50, the skip incrementer 58, the interrupt return register 62, and the stack 46.

MSU PIN FUNCTIONS

Following is a detailed description of the MSU pin functions using the abbreviations noted in FIG. 3:

| | | |
|---|---|---|
| $BA_i$ | Branch Address Bit i | Bidirectional port to Register Counter, Interrupt Register, and Branch Address Multiway Multiplexer and LIFO (last-in-first-out) Stack. BA0 is LSB (least significant bits). (16 bits-bidirectional) |
| $MW_i$ | Multi-Way Bit i | Bits used in conjunction with either the Branch Address, Interrupt Register or the Register Counter in forming an address. MW0 is LSB. (4 Bits-input) |
| $A_i$ | Microprogram Address Bit i | Address to microprogram storage. A0 is LSB. (16 bits-bidirectional) |
| $INST_i$ | Instruction Bit i | Selects one of 32 instructions to be performed by the sequencer. I0 is LSB. (5 Bits-input) |
| $SCF_i$ | Source Control Field ($SCF_{1,0}$) | A multi-function field used to control the loading of the Register/Counter and Interrupt Register, as well as controlling the multi-way-multiplexer depending on the instruction being executed. SCF0 is LSB. (2 Bits-input) |
| TC EN | Test Condition Enable | When active, permits the test condition input to control any instruction which samples the test condition. When inactive, forces the test condition input to its pass state. (one signal line-input) |
| TC POL | Test Condition Polarity | Used to control the polarity of the test condition input. It is not used when TC EN is inactive. (one signal line-input) |
| TC | Test Condition | Sampled by an instruction that makes a decision on the state of the signal. Only has meaning when TC EN is active. (one signal line-input) |
| $IE_i$ | Interrupt Enable | When active, permits the interrupt input (INTR) to cause a branch to interrupt routine while saving the current instruction address ($A_{int}$) in the Interrupt Return register. IE0 is LSB (2 Bits-input) |

| IE1 | IE0 | INTR | Address Source |
|---|---|---|---|
| 0 | X | X | $A_{int}$ |
| 1 | 0 | 1 | Disable $A_i$ |
| 1 | 1 | 1 | Intr. Reg. |

| | | |
|---|---|---|
| INTR | Interrupt | This signal, when active in conjunction with the IE1, causes the interrupt routine address to be made available to Ai. The INTR is synchronized with respect to the low to high transition of the clock. The sequencer must see a low to high transition on either the INTR or IE1 in order to detect a valid interrupt. (One signal line-input) |
| OE | Output Enable | When active, enables the Ai output buffers, otherwise forces them to the cutoff state. (one signal line-input) |
| CLK | Clock | Triggers all internal state changes on low to high transition. (One signal line-input) |
| CLR | Clear | When active, initializes the stack pointer to zero, indicating empty, and produces a zero address on Ai. (One signal line-input) |
| PLR | Pipeline Register Select | Can be used to select a source for the BAi inputs, generally the Pipeline Register. (One signal line-output) |
| MAP | Map Select | Can be used to select a source for the BAi inputs, generally a Mapping Prom or PLA. (One signal line-outout) |
| VEC | Vector Select | Can be used to select a source |

-continued

| | | |
|---|---|---|
| | | for the BAi inputs, generally a Starting Address supplied via switches for diagnostic purposes. (one signal line-output) |
| ISS | Interrupt Source Select | Used to select an interrupt vector address attached directly to the Ai output lines. This signal will only go active when interrupt is enabled, the interrupt is active and the source is not the internal interrupt Register. The Ai output buffers are disabled. (one signal line-output) |
| SOUT | Stack Out | Activated when a Fetch, Pop and Conditionally Restore Registers instruction is executed to indicate the Stack Output is available on BAi. This signal will not be activated if the Stack is empty. (one signal line-output) |
| SFLT | Stack Fault | When active indicates that either a stack overflow or underflow has occurred. This status remains active until either the proper push/pop instruction or a Branch to BA and Clear Stack Pointer instruction is executed or CLR is applied. (one signal line-output) |
| ISVC | Interrupt Service | This signal line is activated when an interrupt is detected and remains active for one clock period while the interrupt routine address is being sourced to Ai. (one signal line-output) |
| MCL | Micro-Code Load | Activated when Microprogram Load instruction is decoded. It will remain active until the Register/Counter is decremented to zero or an Interrupt is detected or CLR is applied. (one signal line-output) |

ADDRESS SOURCES

As above described, the address outputs ($A_i$) can be sourced from the interrupt register, an internal address bus ($A_{int}$) or externally supplied by the user (for example during interrupts). The ($A_{int}$) bus has various possible sources: branch address (BA), register/counter (Reg/Cntr), interrupt register (Intr Reg), microprogram counter (MPC)—each of which can be used in conjunction with four multiway inputs for N-way branching—repeat register (RAR), skip incrementer (SI), interrupt return register (Intr Rtn Reg) and the stack.

Branch Address (BA) 32

The 16-bit branch address (BA) usually originates from more than one external source. The MSU provides specific decoded outputs for the selection of sources such as the pipeline register (PLR), macroinstruction mapper (MAP), vector address (VEC) and a fourth source by the absence of PLR, VEC or MAP. For instructions requiring a transfer of program control, the BA is used as a source for the next microinstruction address. Moreover, four bits of the BA can be substituted by four multi-way inputs ($MW_{0-3}$) for N-way branching. In other words, the BA can be combined with the multi-way inputs to perform a straight branch or 16-way branches off-set by one, four or eight locations. The four multi-way combinations are selected by two Source Control Field inputs ($SCF_0$ and $SCF_1$). The BA can also be used for loading the interrupt register or the register counter, or be pushed onto the LIFO stack. During a stack unload instruction, the contents of the stack are outputted through the bidirectional BA pins and a Stack Out (SOUT) signal is provided for alerting an external device.

Register/Counter 38

The register/counter consists of 16 flip-flops with a common clock. It is loaded via the BA inputs during some instructions on a positive clock transition. The register/counter output, similar to the BA inputs, can be combined with the multi-way inputs for 16-way branching. The contents of the register/counter can also be pushed onto the LIFO stack and later restored by unloading the stack. The register/counter is decremented by one during some instructions, with logic for zero detect provided as an internal test condition. The register/counter is used mainly for iterative operations such as repeat, loop and microprogram loading.

Interrupt Register 62

The 16-bit interrupt register is a general purpose register and is loaded via the BA inputs during some instructions. The interrupt register, similar to the BA inputs and the Register/counter, can be combined with the multi-way inputs for 16-way branching. Another use for the interrupt register is storage for a global microinterrupt vector. When selected, the interrupt register will source the address outputs ($A_i$) of the MSU during an interrupt, while the address being generated by the sequencer instruction execution is stored in the interrupt return register.

Microprogram Counter (MPC) 54

The 16-bit microprogram counter register (MPC) logic is composed of an incrementer followed by an edge-triggered register. During the fetch class of instructions, or during conditional branches with a failed test condition, the contents of the MPC are used as the source for the next microprogram address. The current internal address plus one ($A_{int}+1$) is usually stored in the MPC except in the case of interrupts, when the contents of the MSU address output bus plus one ($A_i+1$) is stored.

Repeat Address Register (RAR) 50

The 16-bit repeat register (RAR) stores the current sequencer address ($A_{int}$) on the LOW-to-HIGH transition of the clock. Its output is also available as a source for the next microprogram address, thus providing capabilities for a micro-instruction to be repeatedly executed without an explicit branch address.

Skip Incrementer 58

The MPC outputs pass through 16-bit incrementer 58, the outputs of which are available as a source for the microinstruction address during skip operations. The skip logic allows effective field sharing of the BA field, with other system control bits in the microinstruction word. Again, the incrementer eliminates the need to provide an explicit branch address during skip operations.

Interrupt Return Register 62

The 16-bit interrupt return register provides storage for the return address after an interrupt. During an interrupt, the internal address normally generated ($A_{int}$) is inhibited from being driven out to the MSU output bus ($A_i$); instead, $A_{int}$ is strobed into the interrupt return register. Therefore, the MSU can be instrrupted while executing any microinstruction and the correct return address will always be saved. Nested interrupts can be handled by pushing the interrupt return register onto the stack.

LIFO Stack 46

The last source of $A_{int}$ is a 16-level by 16-bit stack. One use of the stack is to provide return address linkage for subroutines, loops and interrupts. The stack contains a built-in stack pointer (SP) which always points to the last file word written, allowing stack reference operations (looping) without a pop. The stack pointer linkage is designed such that any sequence of pushes, pops, or stack references can be achieved. An additional use for the stack is storage of the MSU registers during any process change. Paths for pushing the branch address (BA), the register/counter, the interrupt register, the microprogram counter and the interrupt return register onto the stack are available. Correspondingly, the stack contents can be loaded into the interrupt register to the register/counter, driven out to be sampled through the bidirectional BA pins, or used as a source for the next microprogram address ($A_i$).

MSU OPERATION

The basic operating principle of the Microprogram Sequencing Unit is that an address is sourced to the $A_i$ outputs based upon a specific instruction input. The 5-input instruction field provides 32 basic instructions which are enhanced by use of the 2-input Source Control Field and the Test Condition inputs. The basic instruction set can be broken down into four categories: (1) Fetch; (2) Branch; (3) Subroutine; and (4) Special instructions.

The Fetch class of instructions sources the microprogram counter (MPC) to $A_i$. Manipulation of the internal registers and stack is also possible during these instructions. There are seven fetch type instructions; six of them, in combination with the Source Control Field and Test Condition inputs, provide control of the registers and stack. The types of control available are push and pop operations for the stack, loading of the registers via BA or the stack, unloading the stack via BA and providing decoded source/destination selects (i.e., PLR, MAP, VEC, SOUT) for BA.

The Branch instruction category is made up of 14 conditional branch instructions that can make use of the multi-way feature. Within this group there are both 2-way and 3-way branch capability. Branch instruction address sources can be obtained from the branch address inputs (BA), interrupt register, register/counter and microprogram counter (MPC). The MPC is included in the branch instruction group because of the ability to do multi-way branching with respect to the current microinstruction, thus allowing for branch address field sharing.

The multi-way branch capability with offset can enhance performance, especially in systems with relatively short branch routines (less than eight instructions, for example). A known disadvantage of N-way branching (no offset) is that it usually takes another level of indirection, i.e., the first instruction executed after the N-way branch is usually another branch. In a 4-instruction routine, 25% of execution time would be spent in branching to the routine. Multi-way branching with offset eliminates the need for a second branch instruction and can be selected with four or eight locations of separation. Other features performed by the branch instructions involve popping the stack, decrementing the register/counter for effective loop control and resetting the stack pointer to zero, effectively clearing the stack.

The Subroutine group of instructions provides the mechanism for effectively branching to the microprogram routines and, upon completion, returning to a previous routine without an explicit address. The return linkage is handled by the LIFO stack. There are five instructions devoted to subroutine handling, including four branch-to-subroutine instructions and one return-from-subroutine instruction. All branch-to-subroutine instructions can make use of the multi-way/offset capability of the sequencer. The return-from-subroutine instruction has a dual role, depending upon when it is executed. If the instruction is used in response to a branch-to-subroutine instruction, then the return address is provided by the LIFO stack. If the return-from-subroutine instruction is executed in response to the interrupt, then the return linkage is provided by the interrupt return register. For those concerned with interrupt nesting and/or subroutine nesting within an interrupt routine, provisions are made for pushing the interrupt return register onto the stack, thus allowing for proper return linkage. Also with the ability to push directly onto the stack from BA, interrupt register and register/counter, unconventional return linkages can be set up in advance.

The Special instructions complete the MSU instruction repertoire by providing the ability to repeat, loop, skip and perform microprogram loading. Repeat and loop instructions can be set up using either the test condition inputs or the internal register/counter equals zero detection. The skip instruction only uses the test condition inputs. All defaults in these instructions source the microprogram counter (MPC) to $A_i$. The microprogram load instruction provides automatic generation of successive microinstruction addresses. This sequential address generation continues until the register/counter equals zero, an interrupt occurs, or clear (CLR) is applied. A decoded control signal, micro-code load (MCL), is activated whenever a microprogram load is being executed. The instruction inputs do not have to be maintained after the initial cycle.

The asynchronous interrupt function is accomplished through the use of a 2-input Interrupt Enable field ($IE_1$, $IE_\phi$) and the interrupt (INTR) signal itself. The $IE_\phi$ input is used to select the source of the interrupt vector, i.e., either the internal interrupt register or one externally supplied by the user at the $A_i$ outputs. If the latter is chosen, an Interrupt Source Select (ISS) signal is activated to enable the externally supplied address onto $A_i$. The interrupt enable $IE_1$ can be used as a mask control. This signal must be active in order for the sequencer to detect an interrupt. The interrupt (INTR) is sampled on the LOW-to-HIGH transition of the clock. It is buffered by a latch and therefore may be either a pulse or steady state signal. On the LOW-to-HIGH transition of the clock that detects the interrupt, an Interrupt Service (ISVC) signal is made available to the user to indicate that the sequencer is executing a branch-to-interrupt routine. This signal will only remain active for one cycle. In order for subsequent interrupt detection, either the enable ($IE_1$) or the interrupt (INTR) must be deactivated during one LOW-to-HIGH transition of the clock.

The test condition feature, which is used by a majority of the instructions, consists of an Enable (TC EN), Polarity Control (TC POL) and the Test Condition (TC) input. The following table breaks down the Pass-/Fail states of this feature.

| TC EN | TC POL | TC | STATE |
|-------|--------|-----|-------|
| 0     | X      | X   | Pass  |
| 1     | 0      | 0   | Pass  |
| 1     | 0      | 1   | Fail  |
| 1     | 1      | 0   | Fail  |
| 1     | 1      | 1   | Pass  |

Stack status is provided by an indicator called Stack Fault (SFLT). This status is activated whenever a stack underflow or stack overflow condition occurs. The stack overflow condition occurs after a nesting depth of 16 has been reached (SP=15) and an additional push is attampted. The illegal push is inhibited and stack fault is activated and will remain active until a pop instruction or a branch and reset stack pointer instruction is executed. A clear (CLR) will also reset the status. Similarly, any attempt to pop an empty stack will cause a stack underflow and the activation of Stack Fault (SFLT). A subsequent push instruction or branch and reset stack pointer instruction will clear the condition as well as a general clear (CLR).

A general purpose clear input resets all status and internal control flip-flops as well as the stack pointer. It forces the $A_i$ outputs to the logic zero state. The signal is asynchronous with respect to its leading edge and synchronized to the clock with respect to its deactivation. The repeat address register (RAR) and the microprogram counter (MPC) incrementer inputs are also forced to logic zero. Interrupt handling as well as stack operations are inhibited while clear is active.

A separate Output Enable (OE), when deactivated, forces the $A_i$ outputs to a high impedance state. This allows the user to place any desired address on $A_i$ without disturbing the state of the MSU.

INSTRUCTION SET

The following table lists the thirty-two instructions defined by the five instruction inputs to the function decode 72. Each instruction implies a plurality of conditional instructions depending on the source control field (SCF), the test condition, and the content of the register/counter. Given for each of the instructions are the source of the output address ($A_i$); the effect, if any, on the stack, the register/counter, and the interrupt register; and the external address source, if any. The NOTES accompanying the table further define the instructions.

TABLE

| INSTRUCTIONS | HEX CODE | Ai | STACK | REG./CNTR. | INTR. REG. | SOURCE SELECT: PLR | M A P | V E C | I S S | TEST COND. | REG./CNTR. = 0? | SOURCE CONTROL FIELD S1, S0 | NOTES |
|---|---|---|---|---|---|---|---|---|---|---|---|---|---|
| FETCH MPC | 00 | MPC | — | — | — | 0 | 0 | 0 | 0 | X | X | X X | 1 |
| FETCH MPC; POP; COND. RE-STORE REGS. | 01 | MPC | POP | — | — | 0 | 0 | 0 | 0 | Fail | X | X X | 1 |
|  |  | → | → | STACK→ | — | 0 | 0 | 0 | 0 | Pass | X | 0X |  |
|  |  | → | → | STACK→ | — | 0 | 0 | 0 | 0 | Pass | X | 1X |  |
| FETCH MPC; LOAD REGIS-TERS (PLR, EXT) | 02 | MPC | — | BA→ | BA→ | 0 | 0 | 0 | 0 | X | X | 00 | 1,2 |
|  |  | → | — | BA→ | BA→ | 0 | 0 | 0 | 0 | X | X | 01 |  |
|  |  | → | — | — | BA→ | 1 | 0 | 0 | 0 | X | X | 10 |  |
|  |  | → | — | — | BA→ | 1 | 0 | 0 | 0 | X | X | 11 |  |
| FETCH MPC; PUSH; CONDI-TIONALLY LOAD REGIS-TERS (PLR, EXT) | 05 | MPC | PUSH; MPC +1→ | — | — | M | 0 | 0 | 0 | Fail | X | X X | 1,2,3 |
|  |  | → | → | BA→ | BA→ | 0 | 0 | 0 | 0 | Pass | X | 00 |  |
|  |  | → | → | BA→ | BA→ | 0 | 0 | 0 | 0 | Pass | X | 01 |  |
|  |  | → | → | — | BA→ | 1 | 0 | 0 | 0 | Pass | X | 10 |  |
|  |  | → | → | — | BA→ | 1 | 0 | 0 | 0 | Pass | X | 11 |  |
| FETCH MPC; PUSH; INTR. RTN. REG. LOAD REGIS-TERS (PLR, EXT) | 04 | MPC | PUSH; INTR. RTN. REG. | — | — | M | 0 | 0 | 0 | X | X | X X | 1,2,3 |
|  |  | → | → | BA→ | BA→ | 0 | 0 | 0 | 0 | Pass | X | 01 |  |
|  |  | → | → | BA→ | BA→ | 0 | 0 | 0 | 0 | Pass | X | 10 |  |
| FETCH MPC; PUSH; CONDI-TIONALLY LOAD REGIS-TERS (PLR, EXT) | 06 | MPC | PUSH; RC→ | — | — | M | 0 | 0 | 0 | Fail | X | 0X | 1,2,3 |
|  |  | → | IR→ | — | — | M | 0 | 0 | 0 | Fail | X | 1X |  |
|  |  | → | RC→ | BA→ | — | 0 | 0 | 0 | 0 | Pass | X | 00 |  |
|  |  | → | RC→ | BA→ | — | 0 | 0 | 0 | 0 | Pass | X | 01 |  |
|  |  | → | IR→ | — | BA→ | 1 | 0 | 0 | 0 | Pass | X | 10 |  |
|  |  | → | IR→ | — | BA→ | 1 | 0 | 0 | 0 | Pass | X | 11 |  |
| FETCH MPC; PUSH (PLR, EXT) | 1E | MPC | PUSH; BA→ | — | — | 0 | 0 | 0 | 0 | Pass | X | 11 | 1,2 |
| BRANCH TO BA (PLR) | 07 | BA15-0 | — | — | — | 0 | 0 | 0 | 0 | X | X | X0 | 1,4 |
|  |  | BA15-4; MW (1 apart) | — | — | — | 0 | 0 | 0 | 0 | Fail | X | X1 |  |
|  |  | BA15-4; MW (4 apart) | — | — | — | 0 | 0 | 0 | 0 | Pass | X | 00 |  |
|  |  | BA15-4; MW (8 apart) | — | — | — | 0 | 0 | 0 | 0 | Pass | X | 01 |  |
| BRANCH TO BA AND CLEAR STACK POINTER (PLR) | 0 | MPC | — | — | — | 0 | 0 | 0 | 0 | Pass | X | 10 | 1,4 |
|  |  | BA15-4; MW (1 apart) | — | — | — | 0 | 0 | 0 | 0 | Fail | X 00 | 11 |  |
|  |  | BA15-4; MW (4 apart) | — | — | — | 0 | 0 | 0 | 0 | Pass | X | X X |  |
|  |  | BA15-4; MW (8 apart) | — | — | — | 0 | 0 | 0 | 0 | Pass | X | X X |  |
| BRANCH TO BA (MAP) | 08 | BA15-0 | — | — | — | 0 | 1 | 0 | 0 | X | X | X X | 0 |
|  |  | BA/5-4; MW (1 apart) | — | — | — | 0 | 1 | 0 | 0 | Fail | X | 01 | 1,4 |
|  |  | BA15-4; MW (4 apart) | — | — | — | 0 | 1 | 0 | 0 | Pass | X | 10 |  |
|  |  | BA15-4; MW (8 apart) | — | — | — | 0 | 1 | 0 | 0 | Pass | X | 11 |  |
| BRANCH TO BA (VEC) | 09 | BA15-0 | — | — | — | 0 | 0 | 1 | 0 | X | X | X X |  |
|  |  | BA15-4; MW (1 apart) | — | — | — | 0 | 0 | 1 | 0 | Fail | X | 00 | 1,4 |
|  |  | BA15-4; MW (4 apart) | — | — | — | 0 | 0 | 1 | 0 | Pass | X | 01 |  |
|  |  | BA15-4; MW (8 apart) | — | — | — | 0 | 0 | 1 | 0 | Pass | X | 10 |  |
| BRANCH TO BA |  | MPC | — | — | — | 0 | 0 | 0 | 0 | Fail | X | X X |  |

TABLE-continued

| INSTRUCTIONS | HEX CODE | Ai | STACK | REG./CNTR. | INTR. REG. | SOURCE SELECT: P L R | M A P | V C | I S S | TEST COND. | REG./CNTR. = 0? | SOURCE CONTROL FIELD S1, S0 | NOTES |
|---|---|---|---|---|---|---|---|---|---|---|---|---|---|
| (EXT) | 0A | BA15-0 | — | — | — | 0 | 0 | 0 | 0 | Pass | X | 00 | 1,2,4 |
| | | BA15-4; MW (1 apart) | — | — | — | 0 | 0 | 0 | 0 | Pass | X | 01 | |
| | | BA15-4; MW (4 apart) | — | — | — | 0 | 0 | 0 | 0 | Pass | X | 1 0 | |
| | | BA15-4; MW (8 apart) | — | — | — | 0 | 0 | 0 | 0 | Pass | X | 1 1 | |
| | | MPC | — | — | — | 0 | 0 | 0 | 0 | Fail | X | X X | |
| BRANCH TO REG./CNTR. | 0C | RC15-0 | — | — | — | 0 | 0 | 0 | 0 | Pass | X | 00 | 1,5 |
| | | RC15-4; MW | — | — | — | 0 | 0 | 0 | 0 | Pass | X | 01 | |
| | | RC15-6,1,0; MW | — | — | — | 0 | 0 | 0 | 0 | Pass | X | 1 0 | |
| | | RC15-7,2-0; MW | — | — | — | 0 | 0 | 0 | 0 | Pass | X | 1 1 | |
| | | MPC | — | — | — | 0 | 0 | 0 | 0 | Fail | X | X X | |
| BRANCH TO INTR. REG. | 0B | IR15-0 | — | — | — | 0 | 0 | 0 | 0 | Pass | X | 00 | 1,5 |
| | | IR15-4; MW | — | — | — | 0 | 0 | 0 | 0 | Pass | X | 01 | |
| | | IR15-6,1,0; MW | — | — | — | 0 | 0 | 0 | 0 | Pass | X | 1 0 | |
| | | IR15-7,2-0; MW | — | — | — | 0 | 0 | 0 | 0 | Pass | X | 1 1 | |
| | | MPC | — | — | — | 0 | 0 | 0 | 0 | Fail | X | X X | |
| BRANCH TO MPC | 1F | MPC15-0 | — | — | — | 0 | 0 | 0 | 0 | Pass | X | 00 | 1,5 |
| | | MPC15-4; MW | — | — | — | 0 | 0 | 0 | 0 | Pass | X | 01 | |
| | | MPC15-6,1,0; MW | — | — | — | 0 | 0 | 0 | 0 | Pass | X | 1 0 | |
| | | MPC15-7,2-0; MW | — | — | — | 0 | 0 | 0 | 0 | Pass | X | 1 1 | |
| | | MPC | — | — | — | 0 | 0 | 0 | 0 | Fail | X | X X | |
| BRANCH TO BA AND POP STACK (PLR) | 0D | BA15-0 | POP | — | — | 1 | 0 | 0 | 0 | Pass | X | 00 | 1,4 |
| | | BA15-4; MW (1 apart) | POP | — | — | 1 | 0 | 0 | 0 | Pass | X | 01 | |
| | | BA15-4; MW (4 apart) | POP | — | — | 1 | 0 | 0 | 0 | Pass | X | 1 0 | |
| | | BA15-4; MW (8 apart) | POP | — | — | 1 | 0 | 0 | 0 | Pass | X | 1 1 | |
| | | MPC | — | — | — | 0 | 0 | 0 | 0 | Fail | X | X X | |
| BRANCH TO INTR. REG. AND POP STACK | 0E | IR15-0 | POP | — | — | 1 | 0 | 0 | 0 | Pass | X | 00 | 1,5 |
| | | IR15-4; MW | POP | — | — | 1 | 0 | 0 | 0 | Pass | X | 01 | |
| | | IR15-6,1,0; MW | POP | — | — | 1 | 0 | 0 | 0 | Pass | X | 1 0 | |
| | | IR15-7,2-0; MW | POP | — | — | 1 | 0 | 0 | 0 | Pass | X | 1 1 | |
| | | MPC | — | — | — | 0 | 0 | 0 | 0 | Fail | X | X X | |
| BRANCH TO SUBROUTINE (BA) | 0F | BA15-0 | PUSH; MPC +1→ | — | — | 0 | 0 | 0 | 0 | Pass | X | 00 | 1,4 |
| | | BA15-4; MW (1 apart) | | — | — | 0 | 0 | 0 | 0 | Pass | X | 01 | |
| | | BA15-4; MW (4 apart) | | — | — | 0 | 0 | 0 | 0 | Pass | X | 1 0 | |
| | | BA15-4; MW (8 apart) | | — | — | 0 | 0 | 0 | 0 | Pass | X | 1 1 | |
| | | MPC | — | — | — | 0 | 0 | 0 | 0 | Fail | X | X X | |
| BRANCH TO SUBROUTINE (INTR. REG.) | 10 | IR15-0 | PUSH; MPC +1→ | — | — | 0 | 0 | 0 | 0 | Pass | X | 00 | 1,5 |
| | | IR15-4; MW | | — | — | 0 | 0 | 0 | 0 | Pass | X | 01 | |
| | | IR15-6,1,0; MW | | — | — | 0 | 0 | 0 | 0 | Pass | X | 1 0 | |
| | | IR15-7,2-0; MW | | — | — | 0 | 0 | 0 | 0 | Pass | X | 1 1 | |
| | | REG./CNTR. | — | — | — | 0 | 0 | 0 | 0 | Fail | X | X X | |
| TWO WAY BRANCH (REG./CNTR.; BA) | 11 | BA15-0 | — | — | — | 0 | 0 | 0 | 0 | Pass | X | 00 | 1,4 |
| | | BA15-4; MW (1 apart) | — | — | — | 0 | 0 | 0 | 0 | Pass | X | 01 | |
| | | BA15-4; MW (4 apart) | — | — | — | 0 | 0 | 0 | 0 | Pass | X | 1 0 | |
| | | BA15-4; MW (8 apart) | — | — | — | 0 | 0 | 0 | 0 | Pass | X | 1 1 | |
| | | REG./CNTR. | — | — | — | 0 | 0 | 0 | 0 | Fail | X | X X | |
| TWO WAY BRANCH (REG./CNTR.; INTR. REG.) | 12 | IR15-0 | — | — | — | 0 | 0 | 0 | 0 | Pass | X | 00 | 1,5 |
| | | IR15-4; MW | — | — | — | 0 | 0 | 0 | 0 | Pass | X | 01 | |
| | | IR15-6,1,0; MW | — | — | — | 0 | 0 | 0 | 0 | Pass | X | 1 0 | |

TABLE-continued

| INSTRUCTIONS | HEX CODE | Ai | STACK | REG./CNTR. | INTR. REG. | SOURCE SELECT: PLAR | MAPC | VES | IS | SS | TEST COND. | REG./CNTR. = 0? | SOURCE CONTROL FIELD S1, S0 | NOTES |
|---|---|---|---|---|---|---|---|---|---|---|---|---|---|---|
| TWO WAY BRANCH TO SUBROUTINE (REG./CNTR.; BA) | 13 | IR15-7,2-0; MW | — | — | — | 0 | 0 | 0 | 0 | 0 | Pass | X | 1 1 | |
| | | REG./CNTR. | PUSH; | — | — | 1 | 0 | 0 | 0 | 0 | Fail | X | X X | |
| | | BA15-0 | MPC | — | — | 1 | 0 | 0 | 0 | 0 | Pass | X | 00 | |
| | | BA15-4; MW (1 apart) | +1→ | — | — | 1 | 0 | 0 | 0 | 0 | Pass | X | 1 0 | 1,4 |
| | | BA15-4; (4 apart) | ↓ | — | — | 1 | 0 | 0 | 0 | 0 | Pass | X | 1 1 | |
| | | BA15-4; MW (8 apart) | ↓ | — | — | 1 | 0 | 0 | 0 | 0 | Pass | X | X X | |
| TWO WAY BRANCH TO SUBROUTINE (REG./CNTR.; INTR. REG.) | 14 | REG./CNTR. | PUSH; | — | — | 0 | 0 | 0 | 0 | 0 | Fail | X | 00 | |
| | | IR15-0 | MPC | — | — | 1 | 0 | 0 | 0 | 0 | Pass | X | 01 | 1,5 |
| | | IR15-4; MW | +1→ | — | — | 1 | 0 | 0 | 0 | 0 | Pass | X | 1 0 | |
| | | IR15-6,1,0; MW | ↓ | — | — | 1 | 0 | 0 | 0 | 0 | Pass | X | 1 1 | |
| | | IR15-7,2-0; MW | ↓ | — | — | 1 | 0 | 0 | 0 | 0 | Pass | X | X X | |
| THREE WAY BRANCH (BA) | 15 | STACK | — | DEC | — | 1 | 0 | 0 | 0 | 0 | Fail | N | X X | |
| | | MPC | POP | — | — | 1 | 0 | 0 | 0 | 0 | Pass | N | X X | |
| | | BA15-0 | POP | — | — | 0 | 0 | 0 | 0 | 0 | X | Y | 00 | 1,4 |
| | | BA15-4; MW (1 apart) | POP | — | — | 0 | 0 | 0 | 0 | 0 | X | Y | 01 | |
| | | BA15-4; MW (4 apart) | POP | — | — | 0 | 0 | 0 | 0 | 0 | X | Y | 1 0 | |
| | | BA15-4; MW (8 apart) | POP | — | — | 0 | 0 | 0 | 0 | 0 | X | Y | 1 1 | |
| THREE WAY BRANCH (INTR. REG.) | 16 | STACK | — | DEC | — | 1 | 0 | 0 | 0 | 0 | Fail | N | X X | |
| | | MPC | POP | — | — | 1 | 0 | 0 | 0 | 0 | Pass | N | X X | |
| | | IR15-0 | POP | — | — | 0 | 0 | 0 | 0 | 0 | X | Y | 00 | 1,5 |
| | | IR15-4; MW | POP | — | — | 0 | 0 | 0 | 0 | 0 | X | Y | 01 | |
| | | IR15-6,1,0; MW | POP | — | — | 0 | 0 | 0 | 0 | 0 | X | Y | 1 0 | |
| | | IR15-7,2-0; MW | POP | — | — | 0 | 0 | 0 | 0 | 0 | X | Y | 1 1 | |
| RETURN FROM SUBROUTINE | 17 | MPC | POP | — | — | 0 | 0 | 0 | 0 | 0 | Fail | X | X X | 1,6 |
| | | STACK | — | — | — | 0 | 0 | 0 | 0 | 0 | Pass | X | X X | |
| LOOP ON REG./ CNTR. ≠ 0 | 18 | STACK | POP | DEC | — | 0 | 0 | 0 | 0 | 0 | X | N | X X | 1 |
| | | MPC | — | — | — | 0 | 0 | 0 | 0 | 0 | X | Y | X X | |
| LOOP ON TEST = PASS | 19 | MPC | POP | — | — | 0 | 0 | 0 | 0 | 0 | Fail | X | X X | 1 |
| | | STACK | — | — | — | 0 | 0 | 0 | 0 | 0 | Pass | X | X X | |
| REPEAT ON REG./CNTR. ≠ 0 | 1A | RAR | — | DEC | — | 0 | 0 | 0 | 0 | 0 | X | N | X X | 1,7 |
| | | MPC+1 | — | — | — | 0 | 0 | 0 | 0 | 0 | X | Y | X X | 1,7 |
| REPEAT ON TEST = PASS | 1B | RAR | — | — | — | 0 | 0 | 0 | 0 | 0 | Fail | X | X X | 1 |
| | | MPC | — | — | — | 0 | 0 | 0 | 0 | 0 | Pass | X | X X | |
| SKIP ON TEST = PASS | 1C | MPC | — | DEC | — | 0 | 0 | 0 | 0 | 0 | Fail | N | X X | |
| | | MPC+1 | — | DEC | — | 1 | 0 | 0 | 0 | 0 | Fail | Y | X X | |
| | | MPC | — | — | — | 1 | 0 | 0 | 0 | 0 | Pass | Y | X X | |
| MICROPROGRAM LOAD | 1D | BA15-0 | — | — | — | 0 | 0 | 0 | 0 | 0 | X | X | X X | 1,8 |
| | | RC15-0 | — | — | — | | | | | | | | | |
| | | BA15-0 | — | — | — | | | | | | | | | |
| INTERRUPT: IE1 IE0 INTR | | | | | | | | | | | | | | |
| 1 0 1 | | DISABLED | — | — | — | X | X | X | 1 | 0 | X | X | X X | 9 |

TABLE-continued

| INSTRUCTIONS | HEX CODE | Ai | STACK | REG./CNTR. | INTR. REG. | SOURCE SELECT P L R | M A P | V E C | I S | 0 S | TEST COND. | REG./CNTR. = 0? | SOURCE CONTROL FIELD S1, S0 | NOTES |
|---|---|---|---|---|---|---|---|---|---|---|---|---|---|---|
| | 1 | 1 | — | — | INTR. REG. | X | X | X | X | 0 | X | X | X X | |

ABBREVIATIONS:
Intr. Reg. = IR = Interrupt Register
Intr. Rtn. Reg. = Interrupt Return Register
MPC = Microprogram Counter
RAR = Repeat Address Register
Reg./Cntr. = RC = Register/Counter
POP = Decrement Stack Pointer (SP), provided SP ≠ 0
PUSH = Increment Stack Pointer (SP), provided SP ≠ 15
DEC = Decrement
EXT = External
X = Don't Care
M = See Notes
N = No
Y = Yes
Fail = TC EN = 1 'and' TC = 0
Pass = TC EN = 0 'or' TC = 1
0 = Inactive State
1 = Active State → = to — = No change/Not applicable NOTES:
1 Interrupts Disabled or Inactive:

| IE1 | IE0 | INTR |
|---|---|---|
| 0 | X | X |
| 1 | X | 0 |

2 For EXT, source select is supplied by user, either by decoding sequencer instruction field of micro-instruction or providing a bit in the microinstruction.
3 M — PLR = 0 if S0 = 0; else PLR = 1
4 For multi-way with offset the following bit alignment takes place:
 1 apart: BA15-4→A15-4;MW3-0→A3-0
 4 apart: BA15-6,5,4→A15-6,1,0;MW3-0→A5-2
 8 apart: BA15-7,6-4→A15-7,2-0;MW3-0→A6-3
5 For multi-way with offset the following bit alignment takes place:
 1 apart: X15-4→A15-4;MW3-0→A3-0
 4 apart: X15-6,1,0→A15-6,1,0;MW3-0→A5-2
 8 apart: X15-7,2-0→A15-7,2-0;MW3-0→A6-3
 X = RC or IR or MPC
6 If a Return-from-Subroutine (RFS) instruction is executed with the Intr. Rtn. Reg. active (an interrupt activates the Intr. Rtn. Reg.), then the return linkage is via the Intr. Rtn. Reg. rather than the stack. A CLR, RFS instruction, or any instruction that 'pushes' an address on the stack will deactivate the Intr. Rtn. Reg. until the next interrupt occurs. When the return is via the Intr. Rtn. Reg. the stack pointer remains unchanged.
7 It is advised that a repeat type instruction not be executed as the first instruction of an interrupt routine because the interrupt routine starting address is not into RAR.
8 After decoding the first Microprogram Load (MPL) instruction, the sequencer ignores the instruction field until the Reg./Cntr. equals zero, or an interrupt occurs or CLR is applied. MCL will be activated upon decoding of MPL and will remain active until the above same conditions occur. If on the first MPL instruction, the Reg./Cntr. equals zero or the interrupt is active, then MCL will not be activated. (For Reg./Cntr. equal to zero on the first MPL instruction, (assuming interrupts are disabled or inactive) Ai will be generated based on the Test Condition Fail/Pass state. It should be noted that when an interrupt occurs, Aint is saved in the Intr. Rtn. Reg. as opposed to being routed to Ai.
9 This is not an instruction. It is inserted here to indicate the state of Ai when an interrupt occurs based on the Interrupt Enable inputs.

DETAILED SCHEMATICS

The logic of the microprogram sequencer (MSU) is readily implemented by one skilled in the art based on the data path of FIG. 3 and the instruction set matrix given above.

FIGS. 4–20 are logic schematics of one embodiment using positive logic. Conventional symbology is employed in the schematics. The logic responds to the listed inputs to produce the outputs, all in accordance with the instruction set and the data path. The input and output designations correspond to the designations used in the instruction set matrix, the pin connections, and the data path. High values "H" and low values "L", enable "E", flip-flop "FF", stack write "SW" are abbreviated as indicated.

Figure 4:
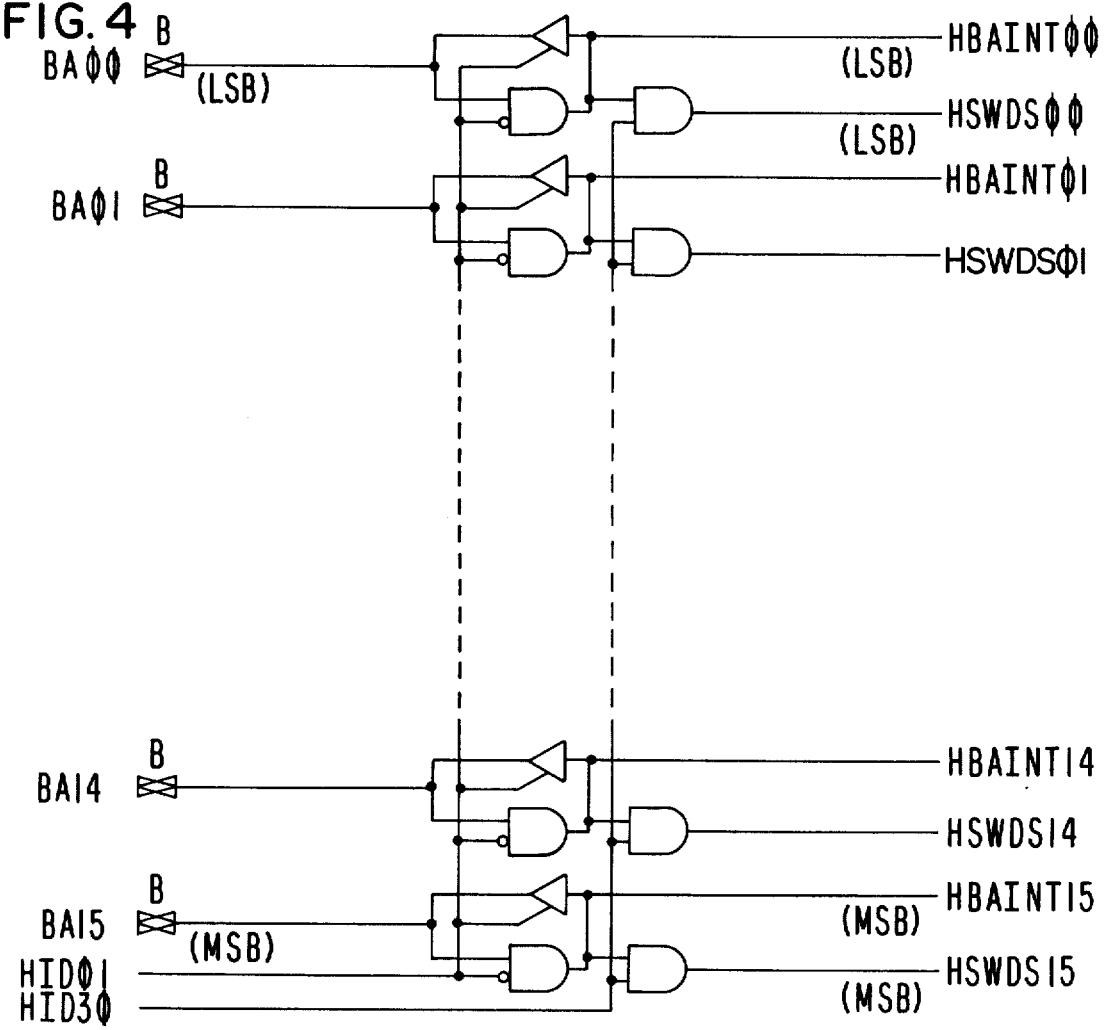
FIG. 4 is a schematic of one embodiment of BA transceivers.
Figure 6A:
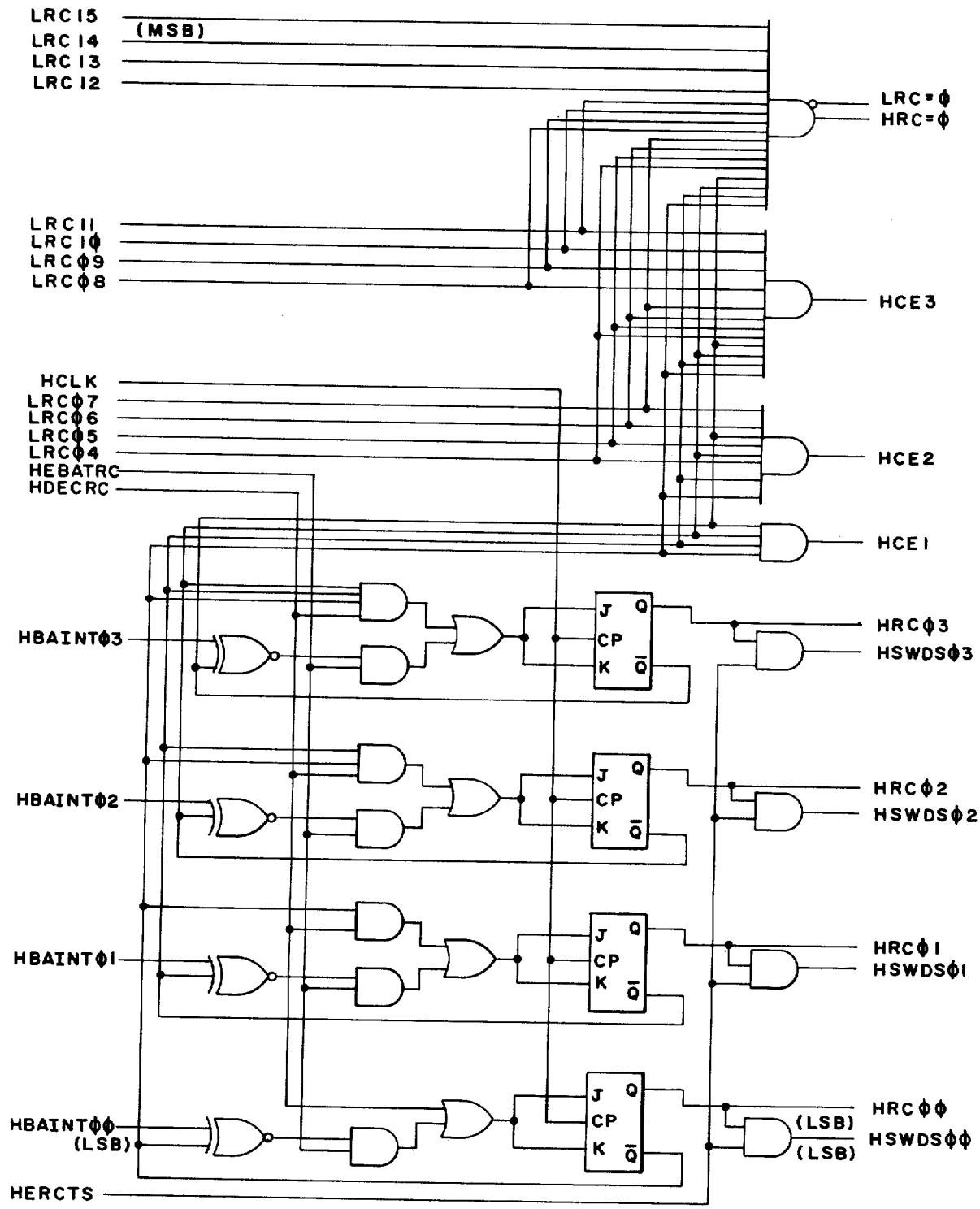
FIGS. 6A–6D are schematics of one embodiment of the register/counter.
Figure 6B:
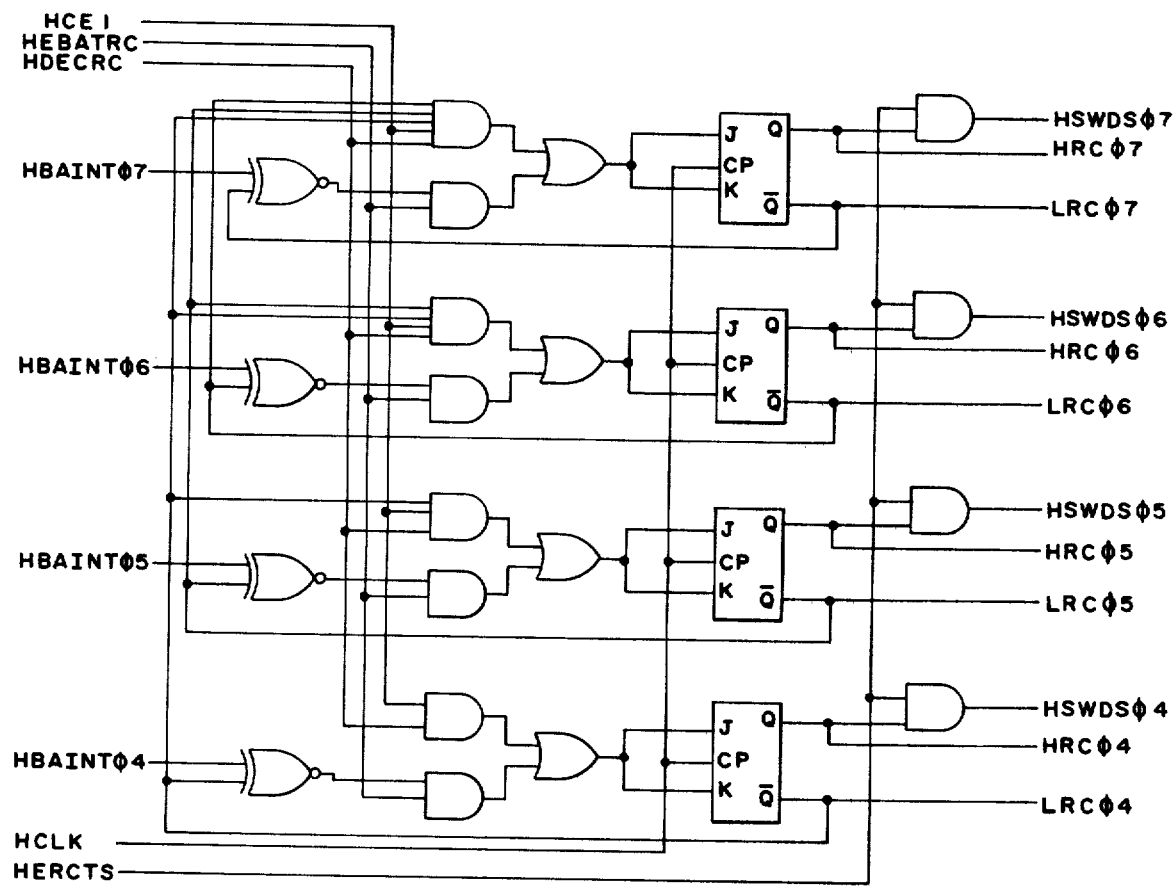
Figure 6C:
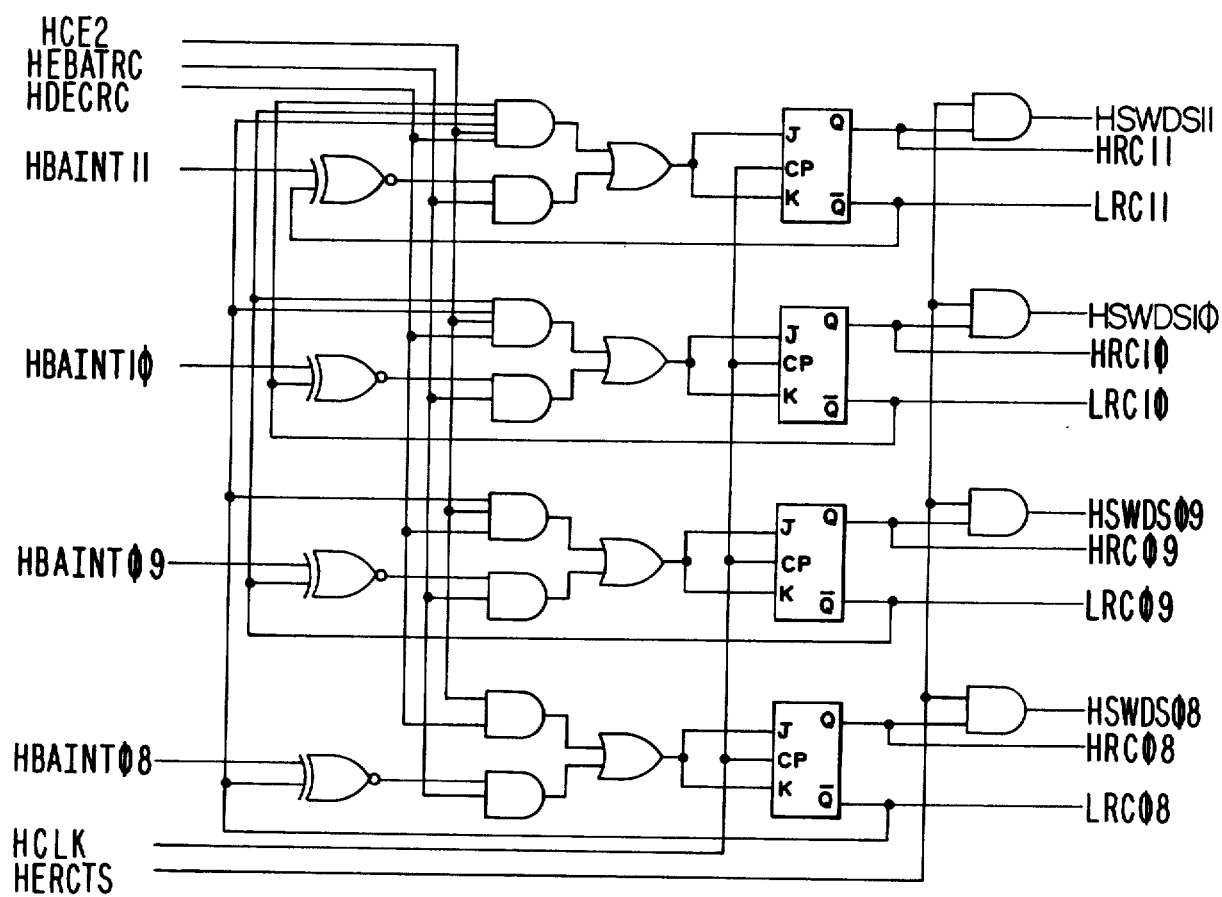
Figure 6D:
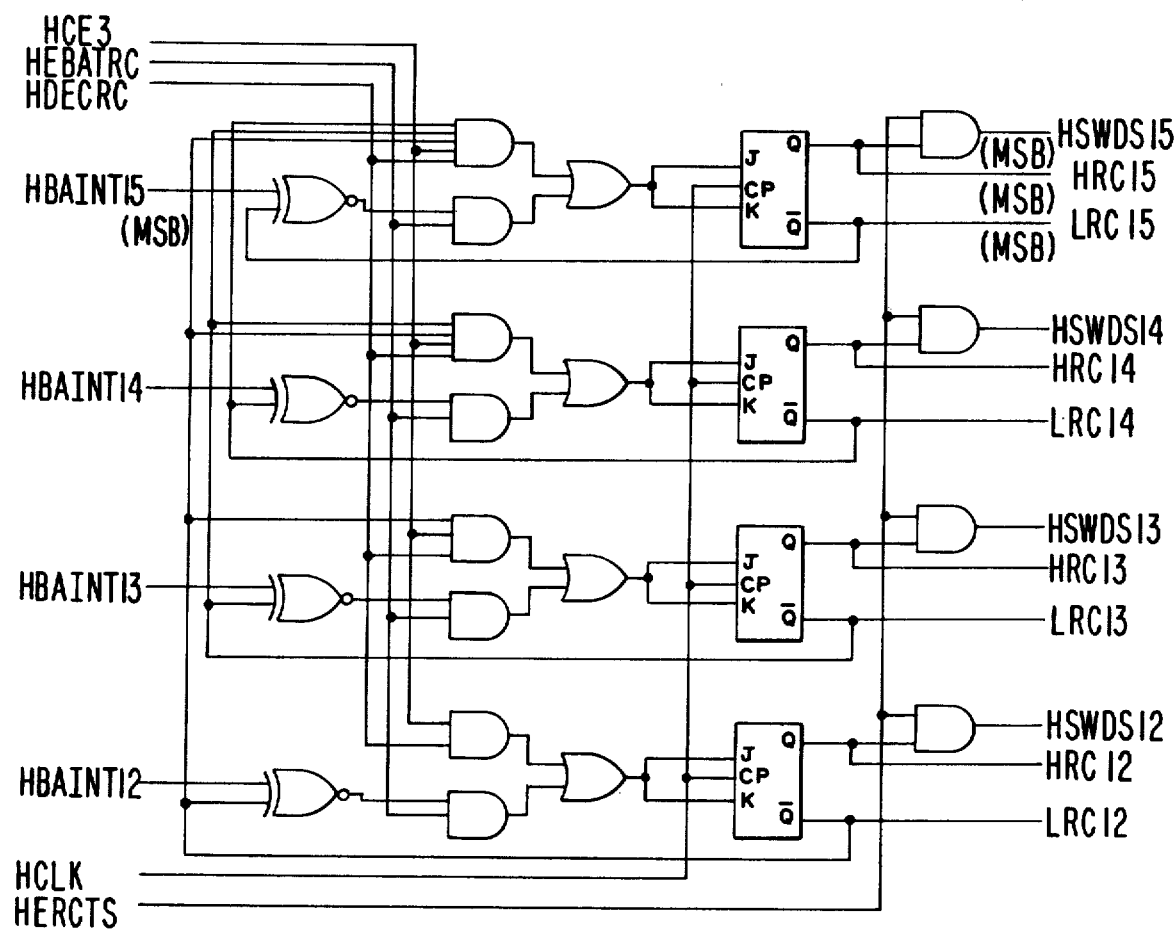

FIG. 4 is a schematic of one embodiment of BA transceivers.

FIG. 5 is a schematic of one embodiment of an interrupt register.

FIGS. 6A–6D are schematics of one embodiment of the register/counter.

Figures 7A, 7B:
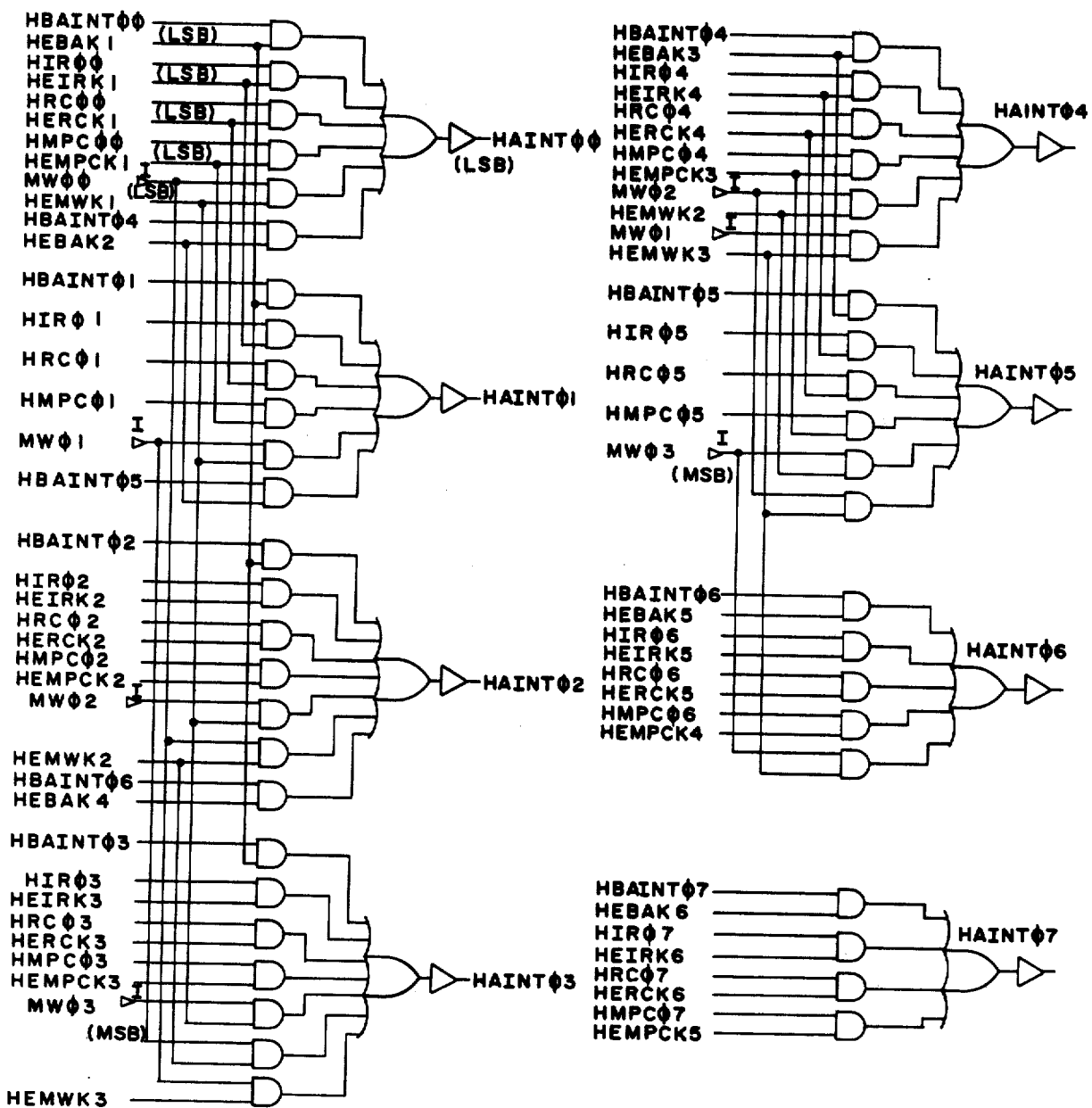
FIGS. 7A–7C are schematics of one embodiment of the branch multiplexer.
Figure 7C:
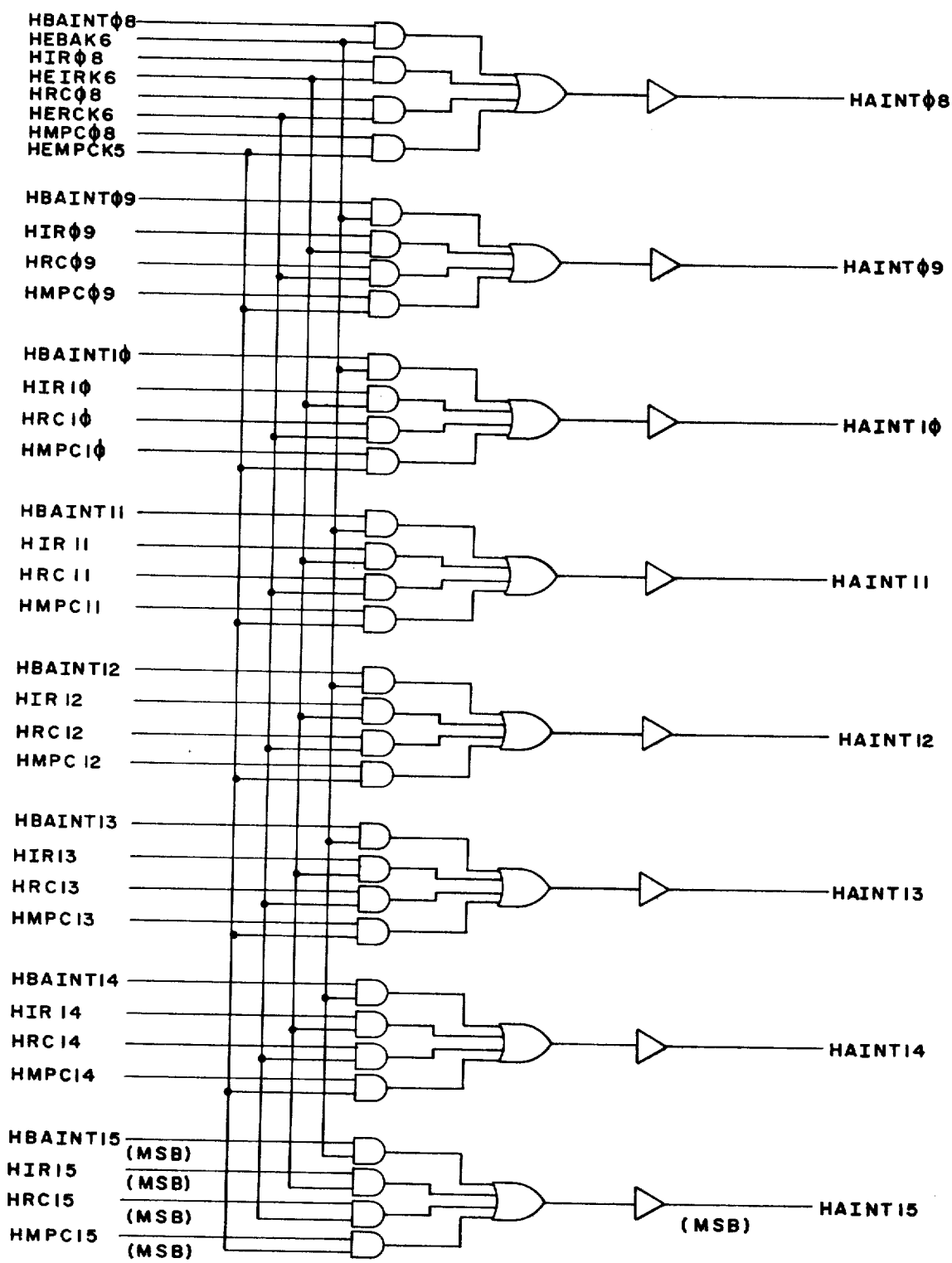

FIGS. 7A–7C are schematics of one embodiment of the branch multiplexer.

Figure 8A:
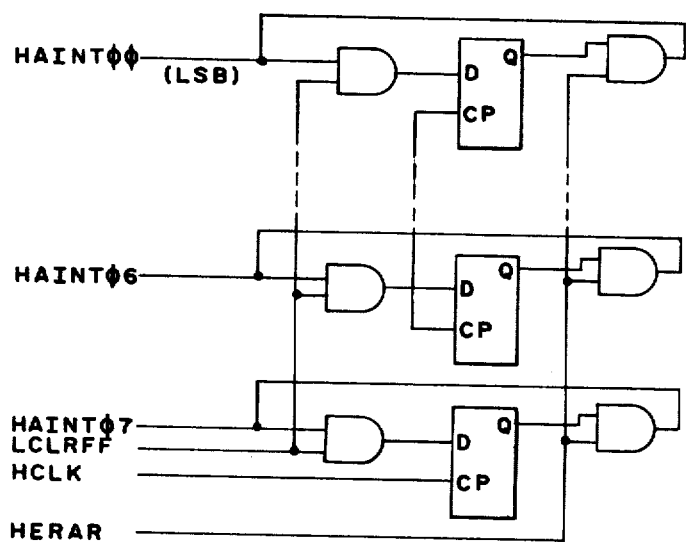
FIGS. 8A–8B are schematics of one embodiment of a repeat address register.
Figure 8B:
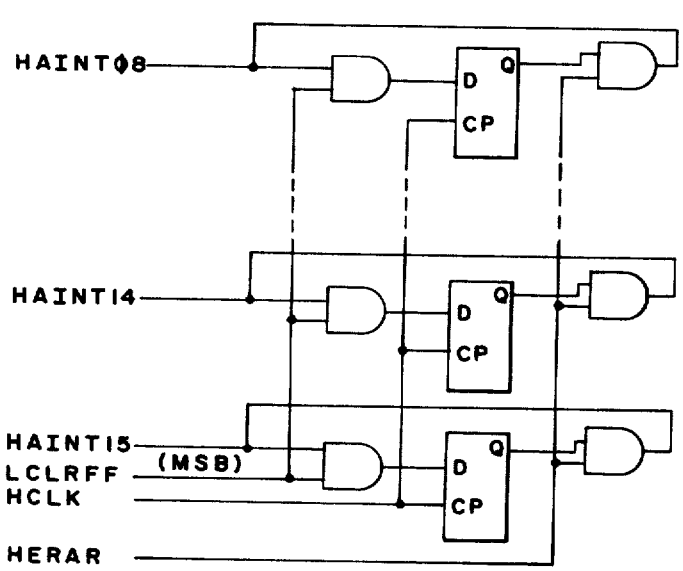

FIGS. 8A–8B are schematics of one embodiment of a repeat address register.

Figure 9A:
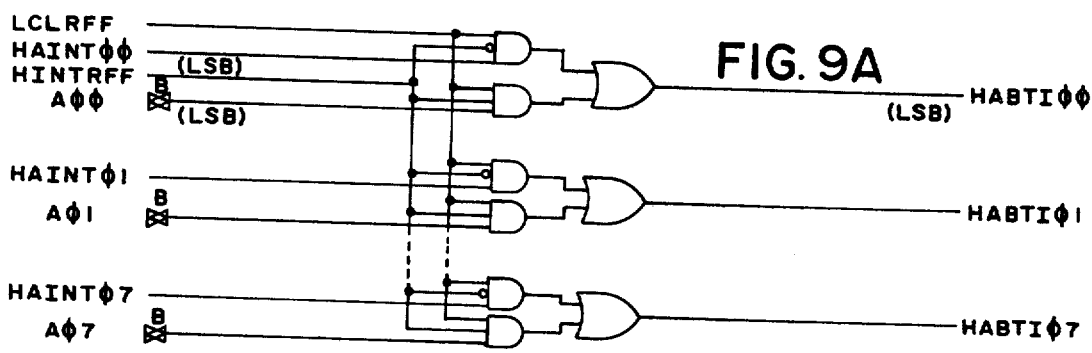
FIGS. 9A–9B are schematic of one embodiment of a microprogram counter incrementer multiplexer.
Figure 9B:
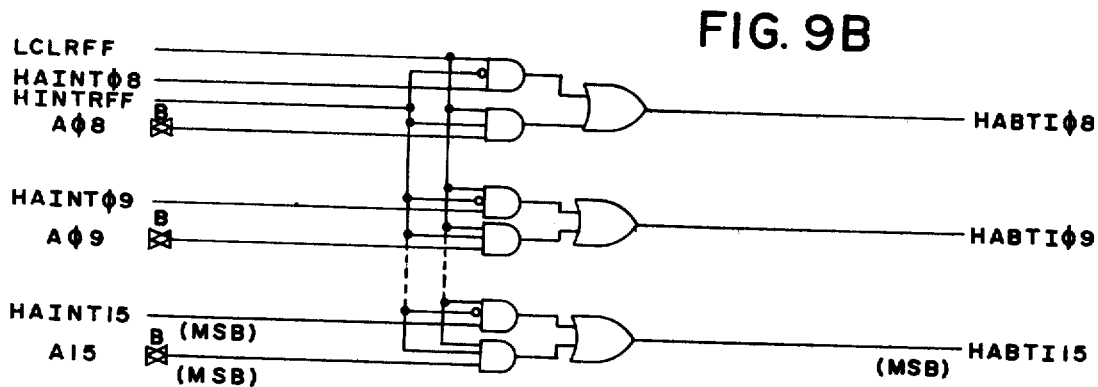
Figure 10A:
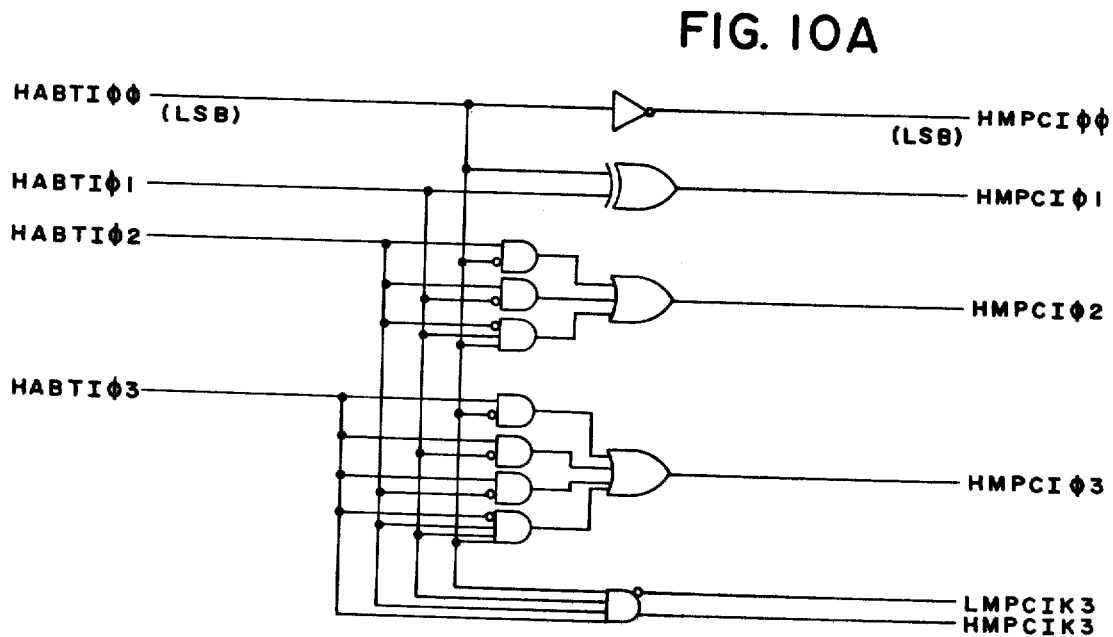
FIGS. 10A–10D are schematics of one embodiment of a microprogram counter incrementer.
Figure 10B:
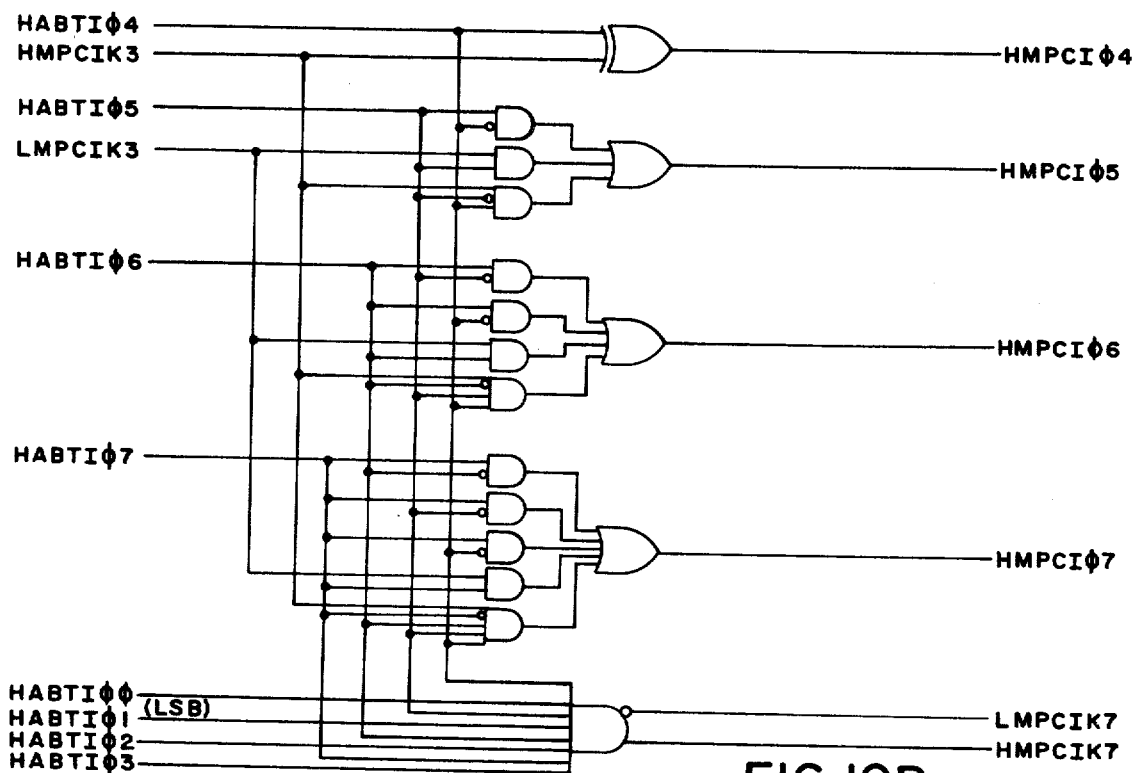
Figure 10C:
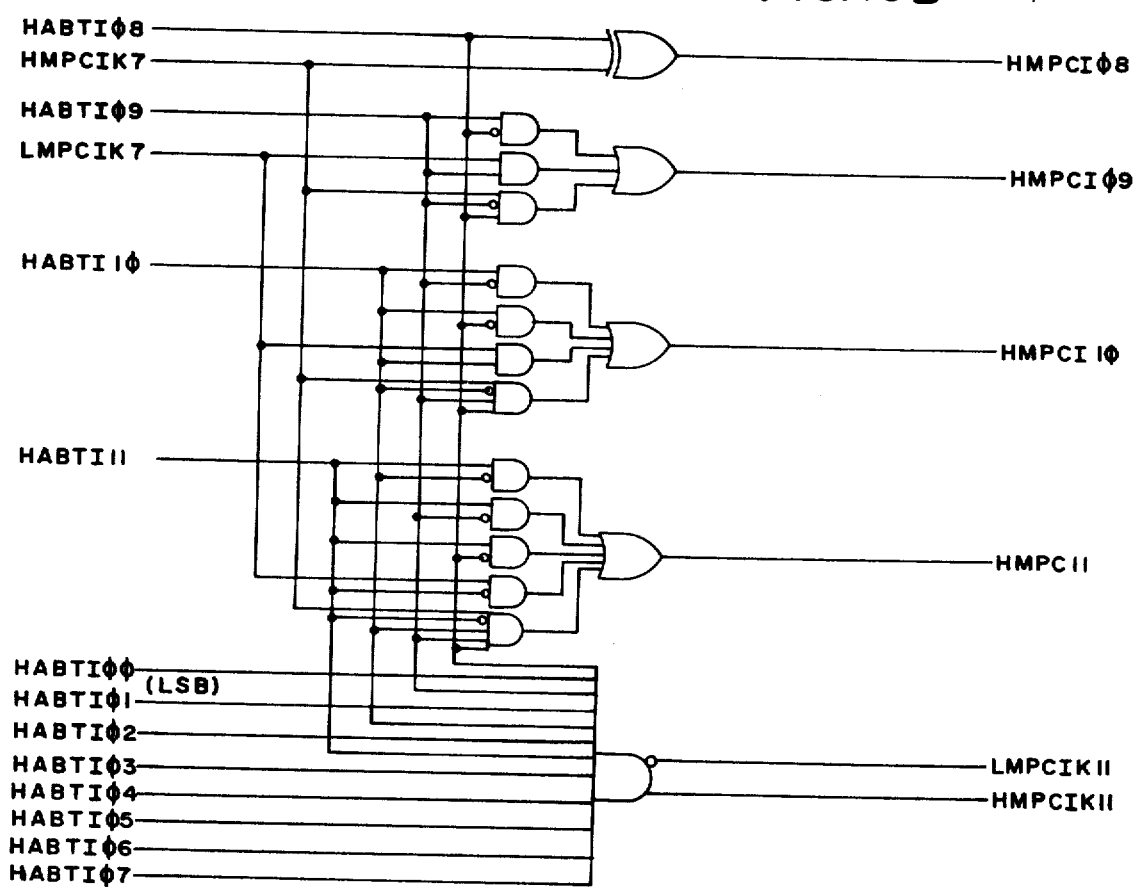
Figure 10D:
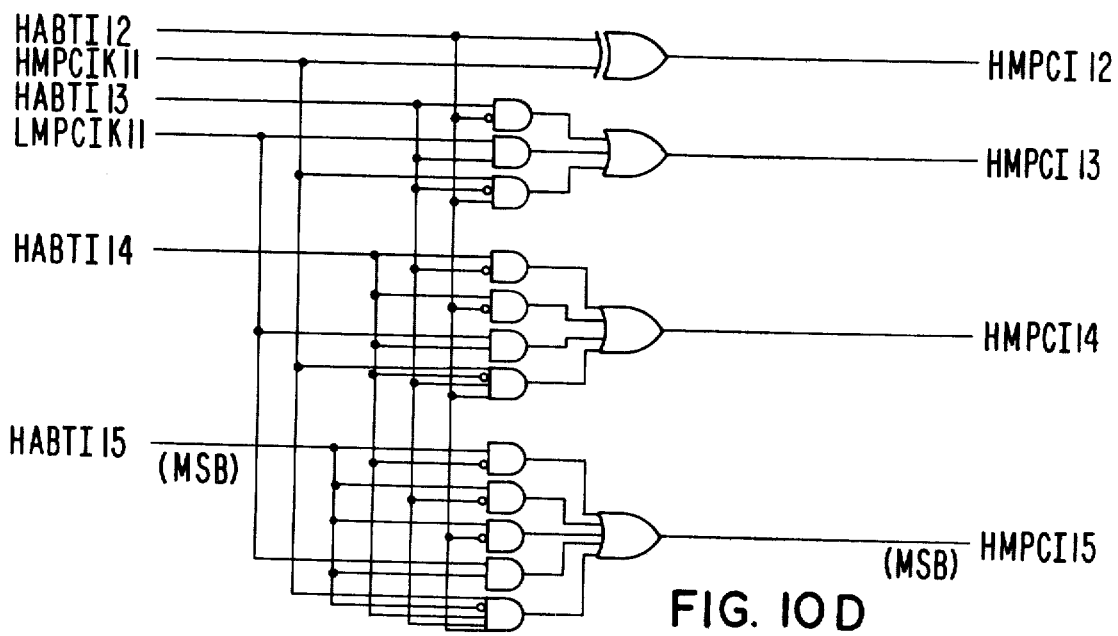

FIGS. 9A–9B are schematics of one embodiment of a microprogram counter incrementer multiplexer.

FIGS. 10A–10D are schematics of one embodiment of a microprogram counter incrementer.

Figure 11:
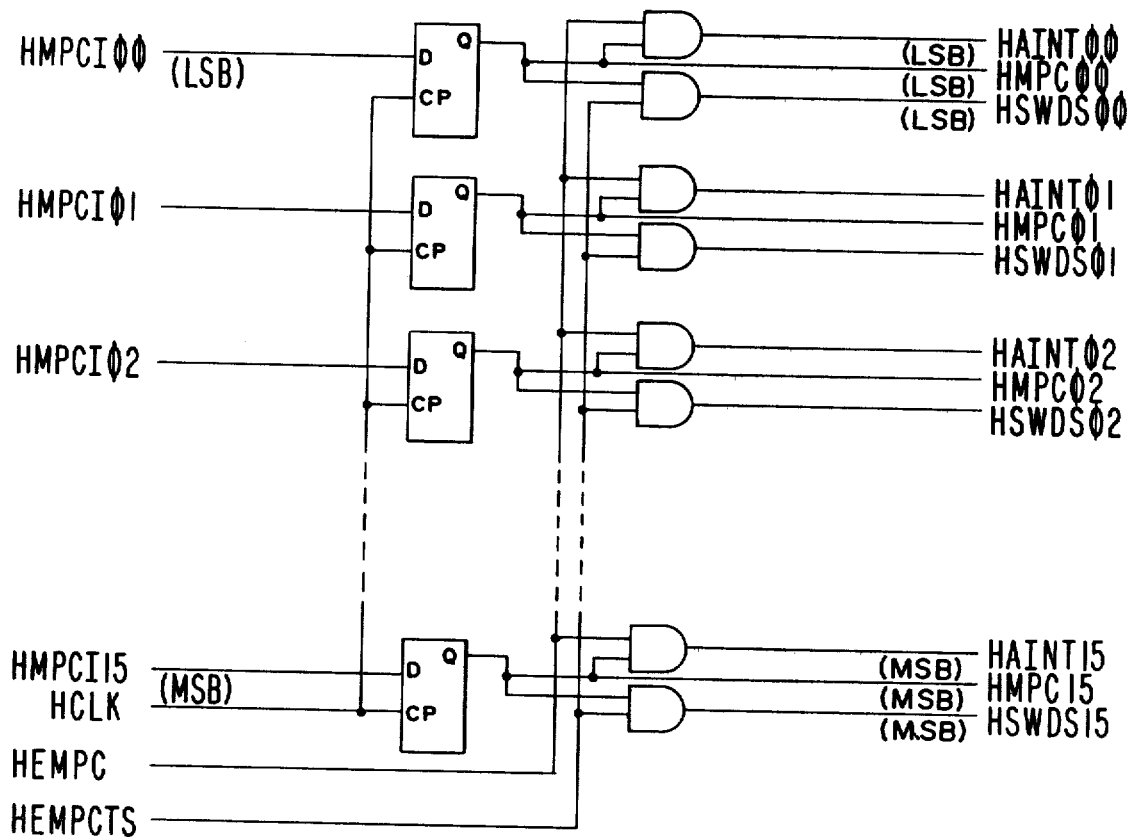
FIG. 11 is a schematic of one embodiment of a microprogram counter register.
Figure 12A:
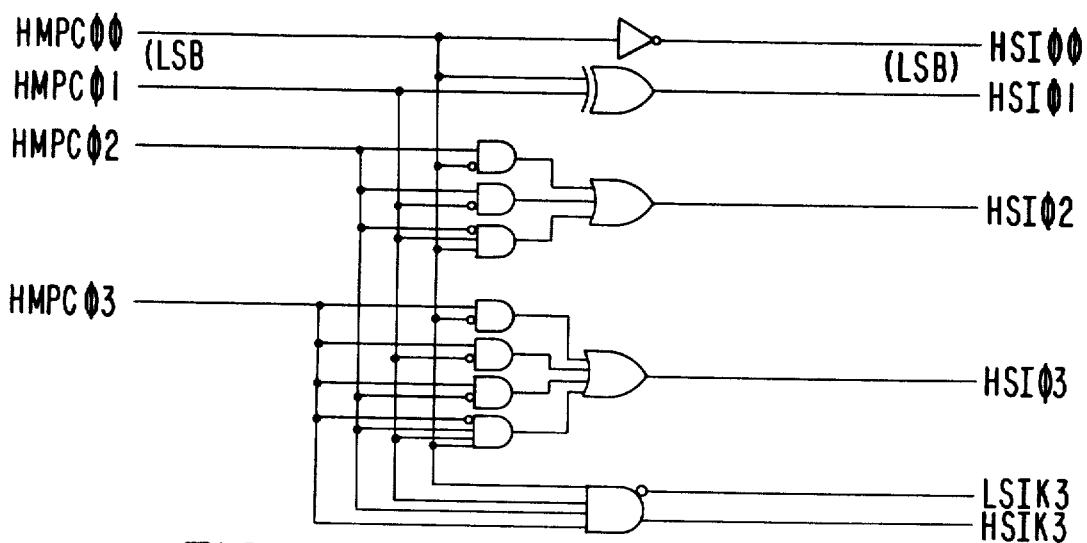
Figure 12B:
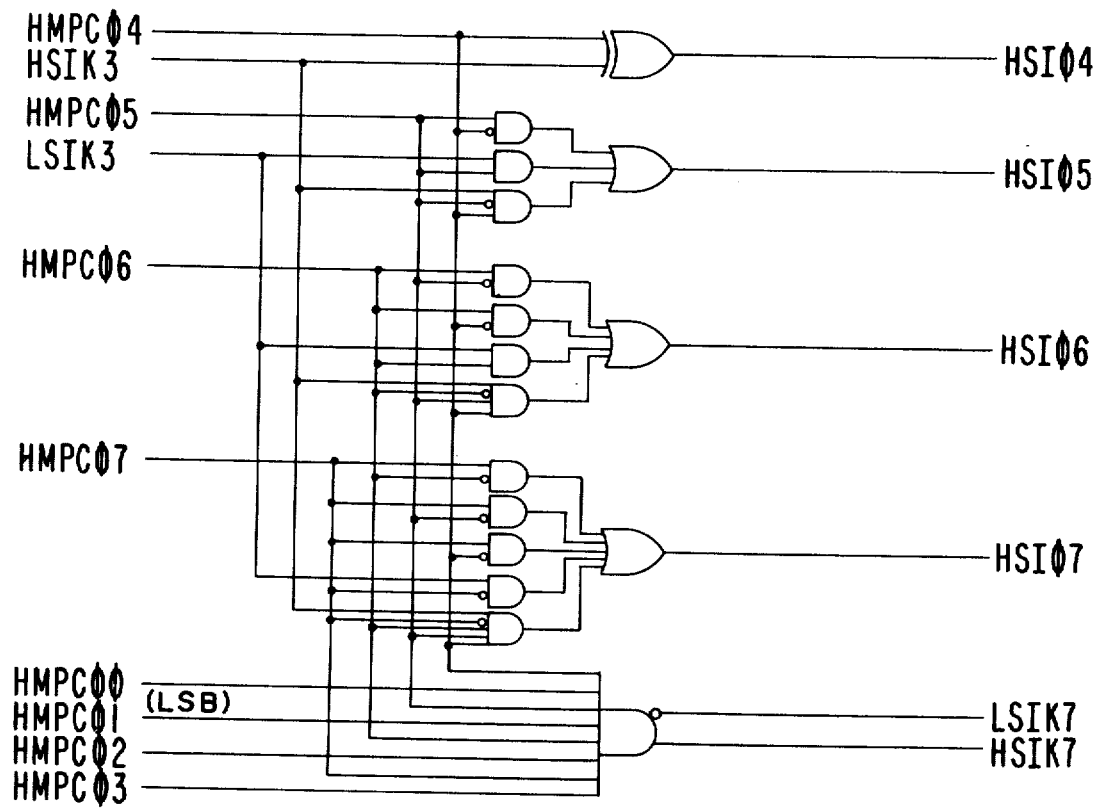

FIG. 11 is a schematic of one embodiment of a microprogram counter register.

FIGS. 12A–12E are schematics of one embodiment of a skip incrementer.

FIG. 13 is a schematic of one embodiment of an interrupt return register.

Figure 14:
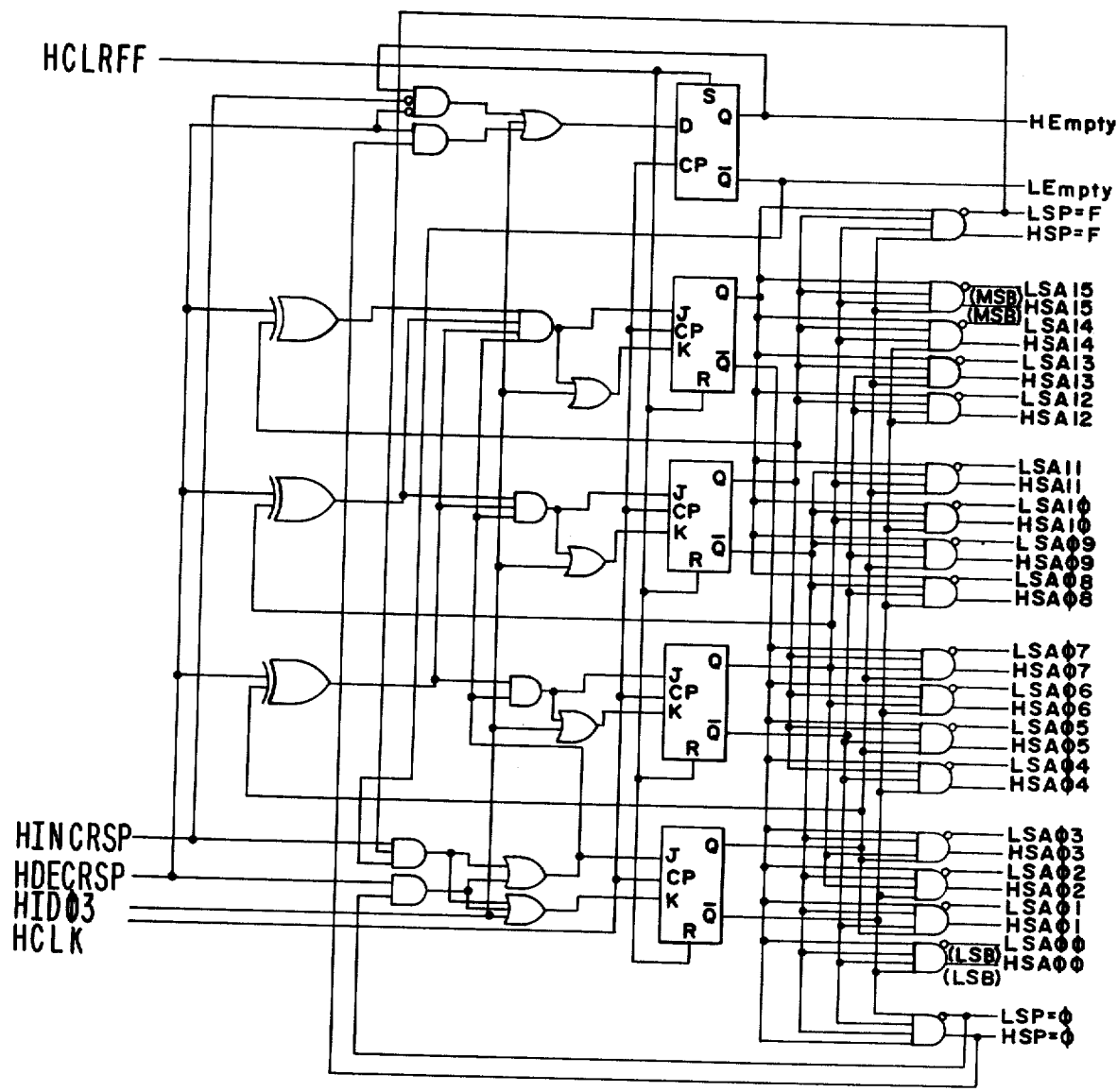
FIG. 14 is a schematic of one embodiment of a stack pointer.

FIG. 14 is a schematic of one embodiment of a stack pointer.

Figure 15:
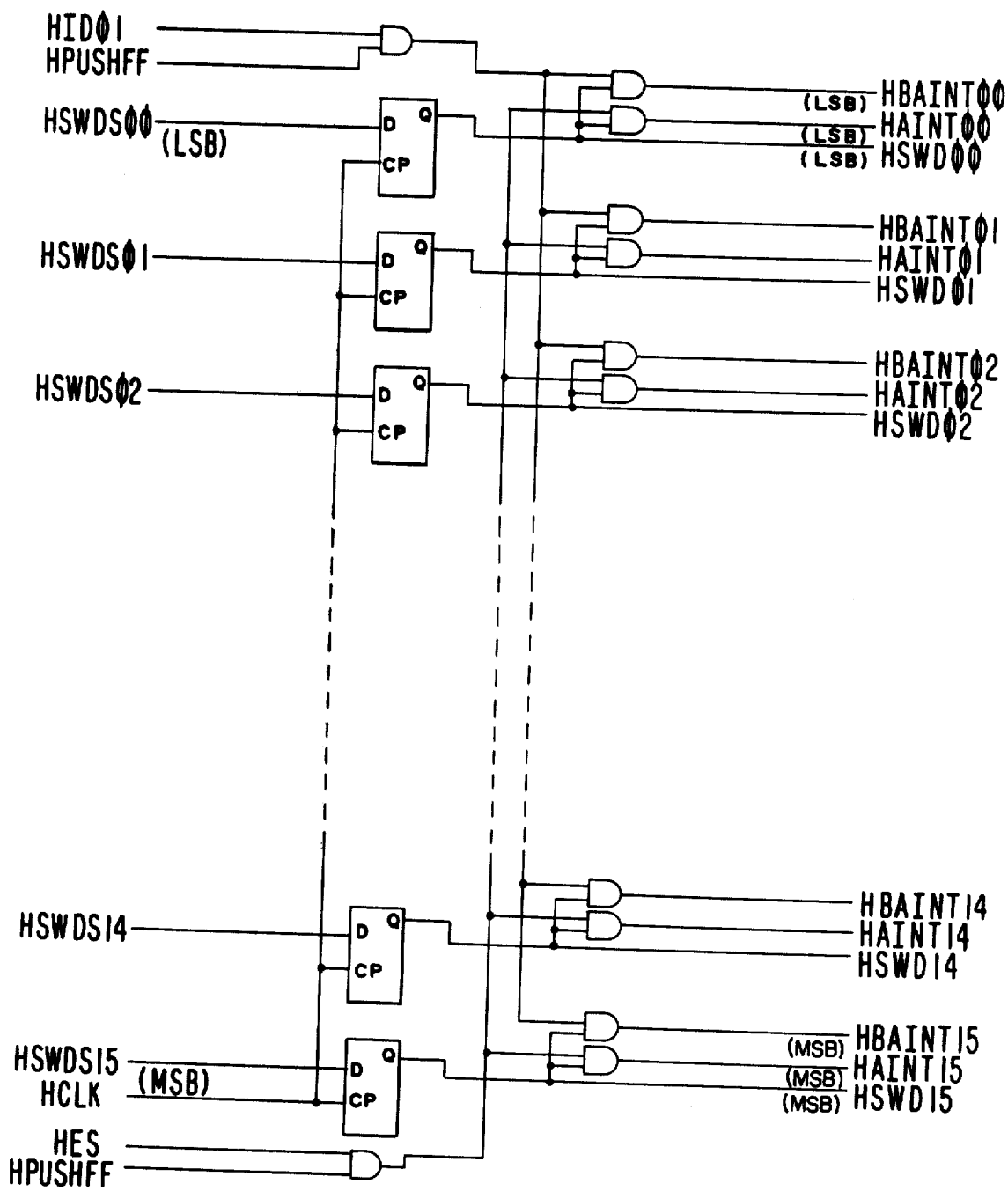
FIG. 15 is a schematic of one embodiment of a stack write register.

FIG. 15 is a schematic of one embodiment of a stack write register.

Figure 16:
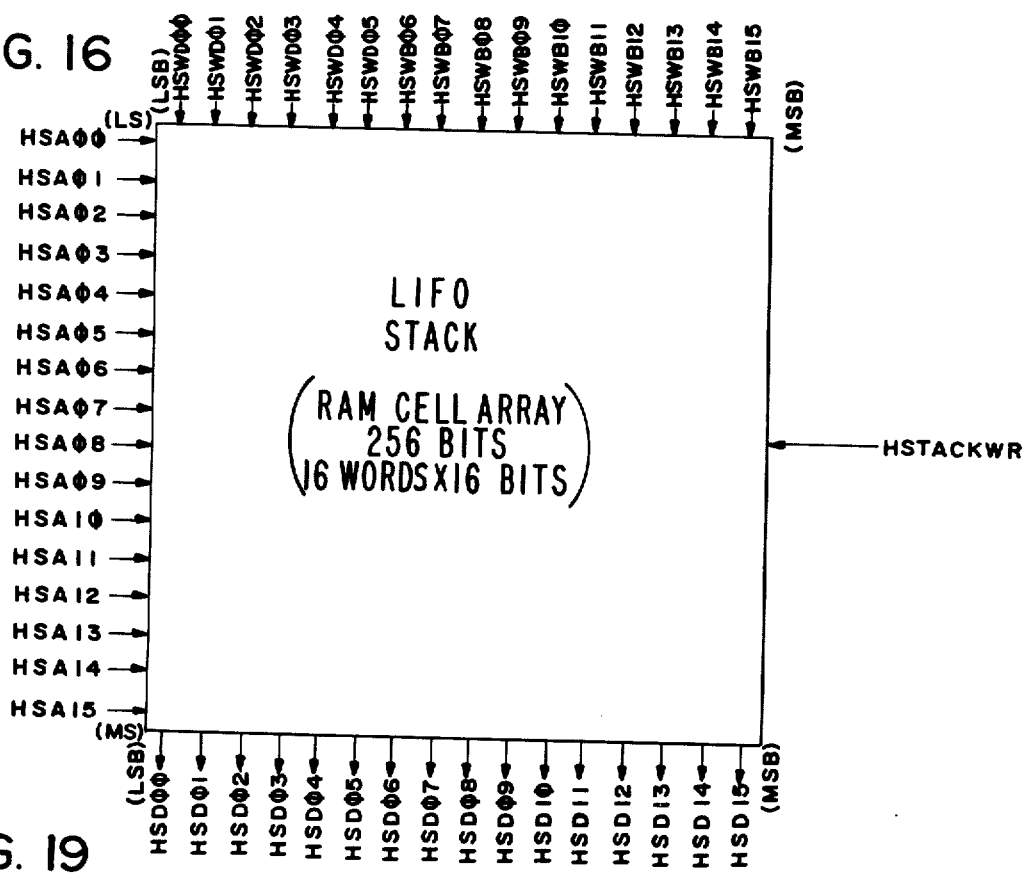
FIG. 16 is a schematic of one embodiment of a multilevel storage means (stack).

FIG. 16 is a schematic of one embodiment of a multilevel storage means (stack).

Figure 17:
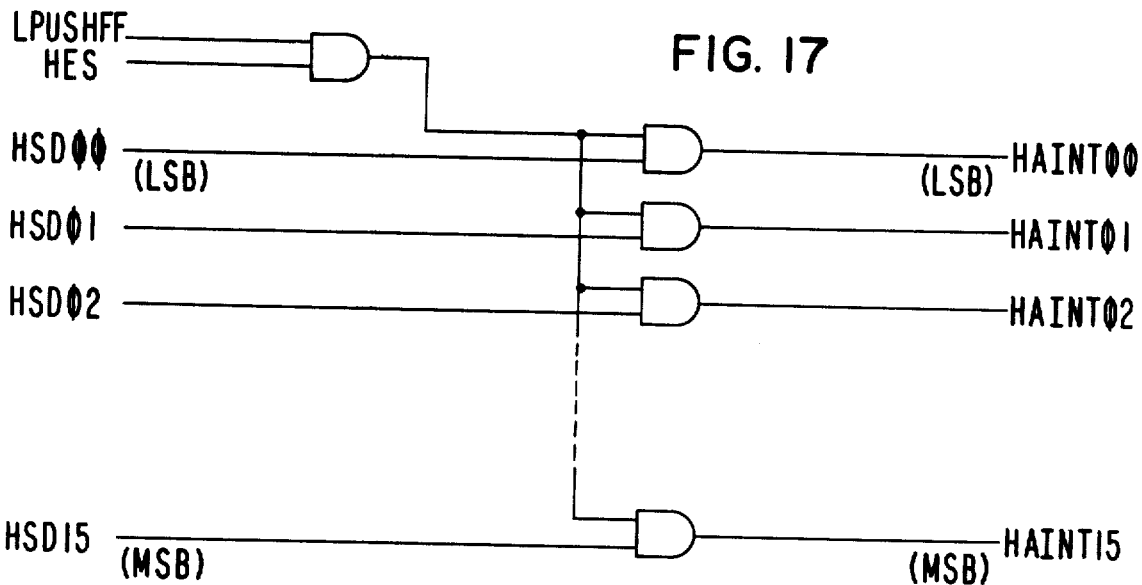
FIG. 17 is a schematic of one embodiment of a stack to $A_{int}$ buffer.

FIG. 17 is a schematic of one embodiment of a stack to $A_{int}$ buffer.

Figure 18:
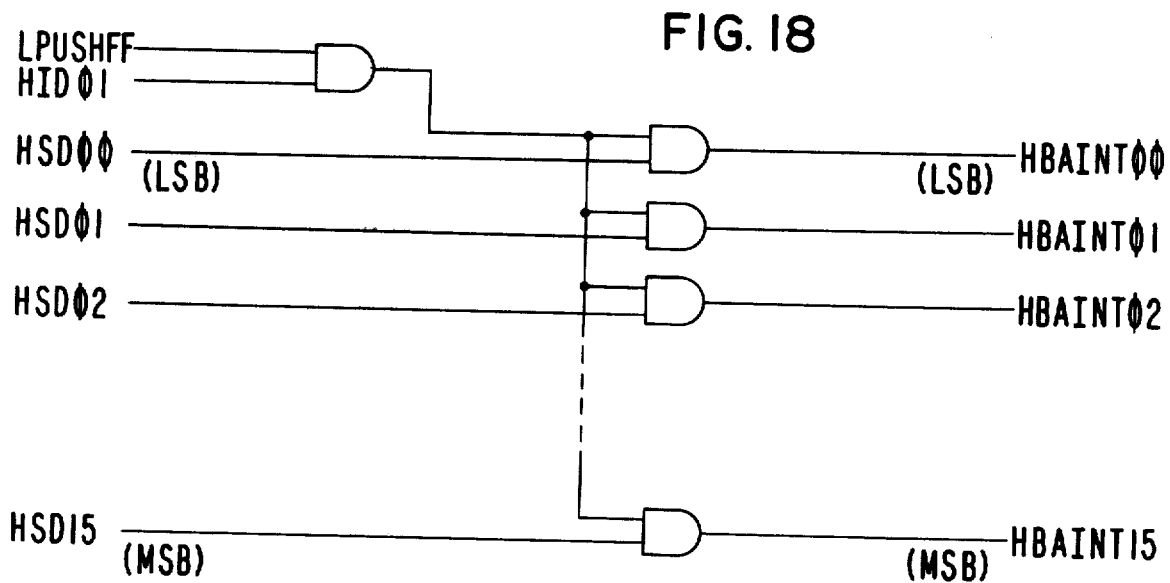
FIG. 18 is a schematic of one embodiment of a stack BA buffer.
Figure 20C:
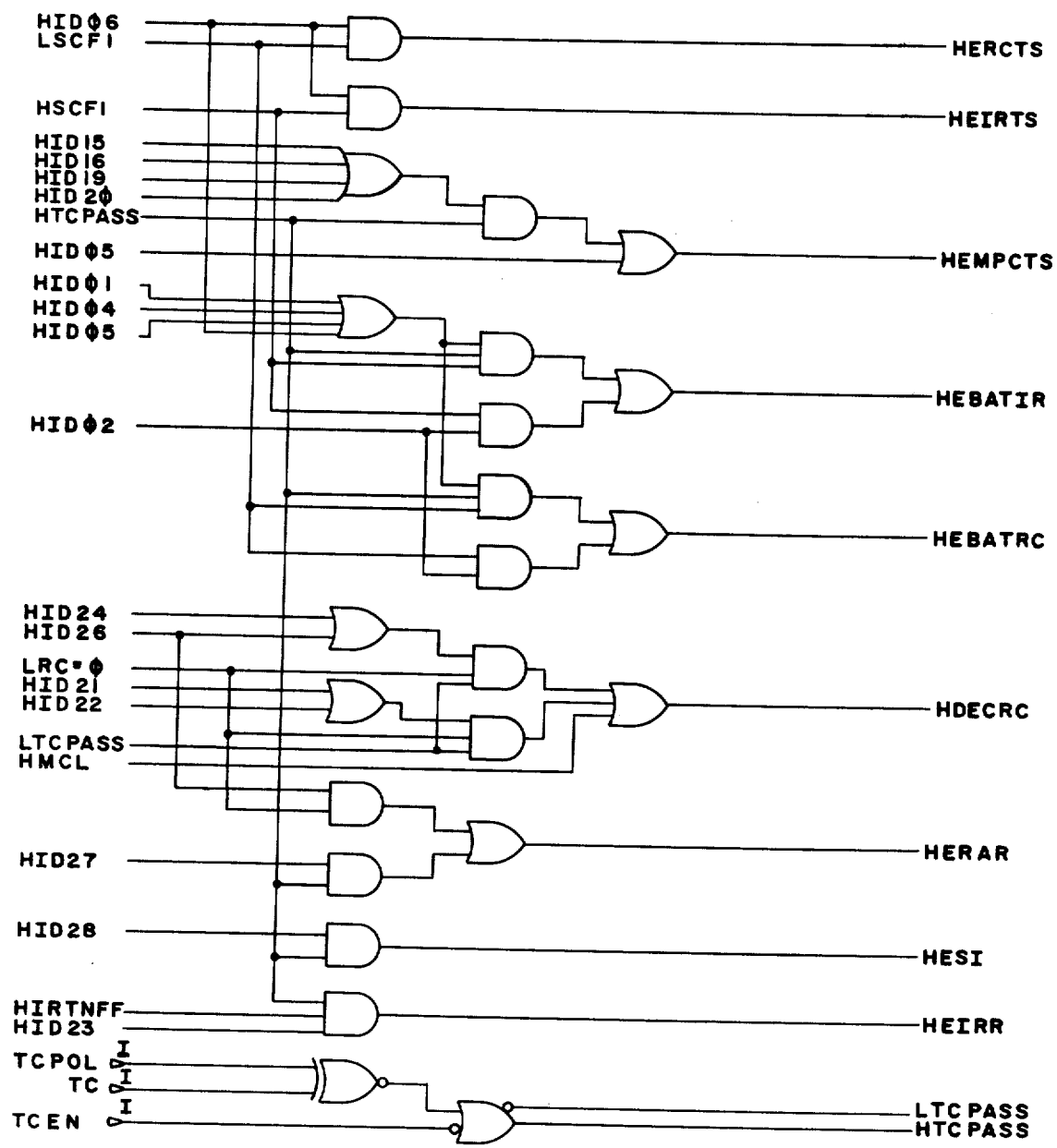
Figure 20D:
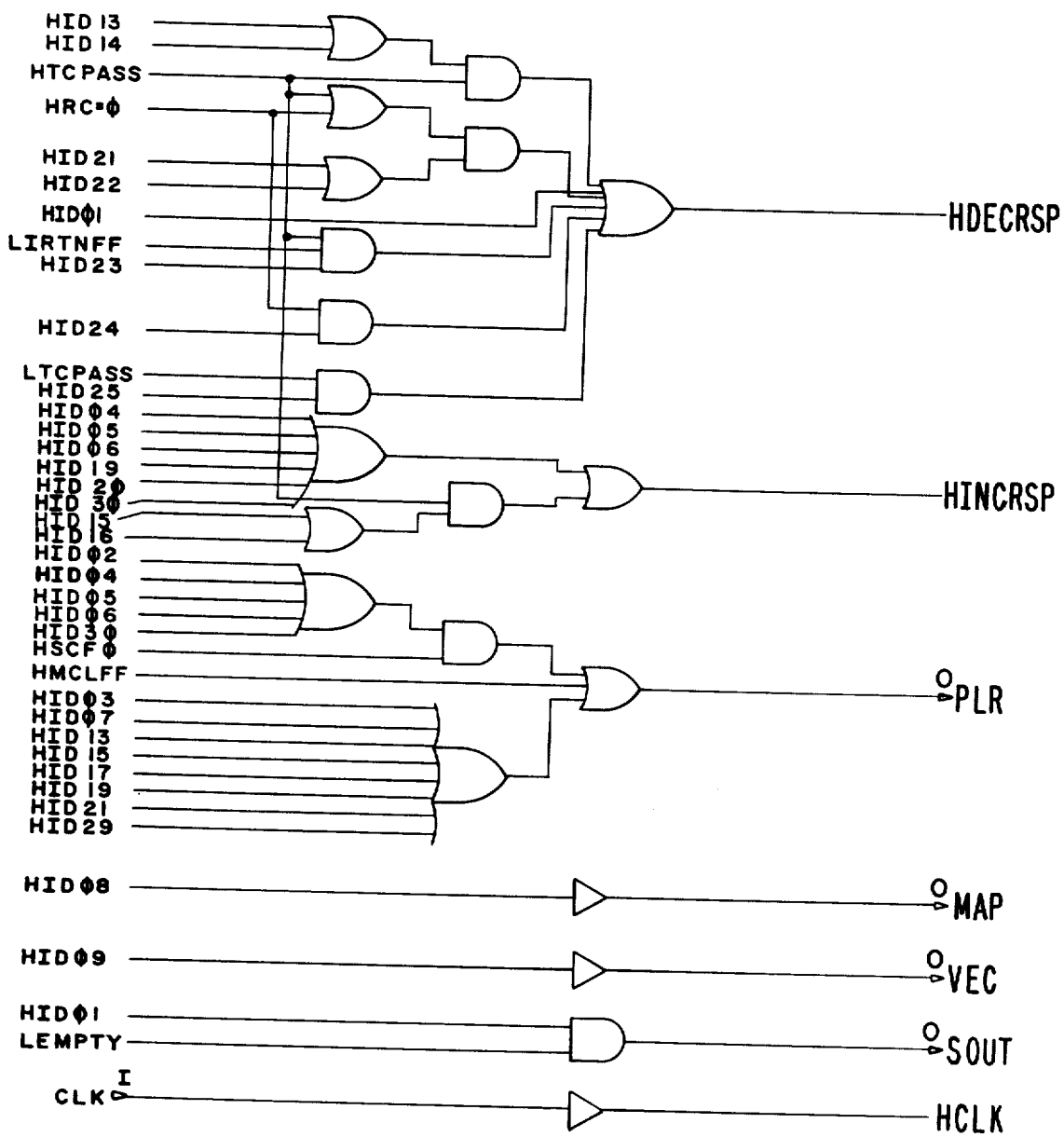
Figure 20E:
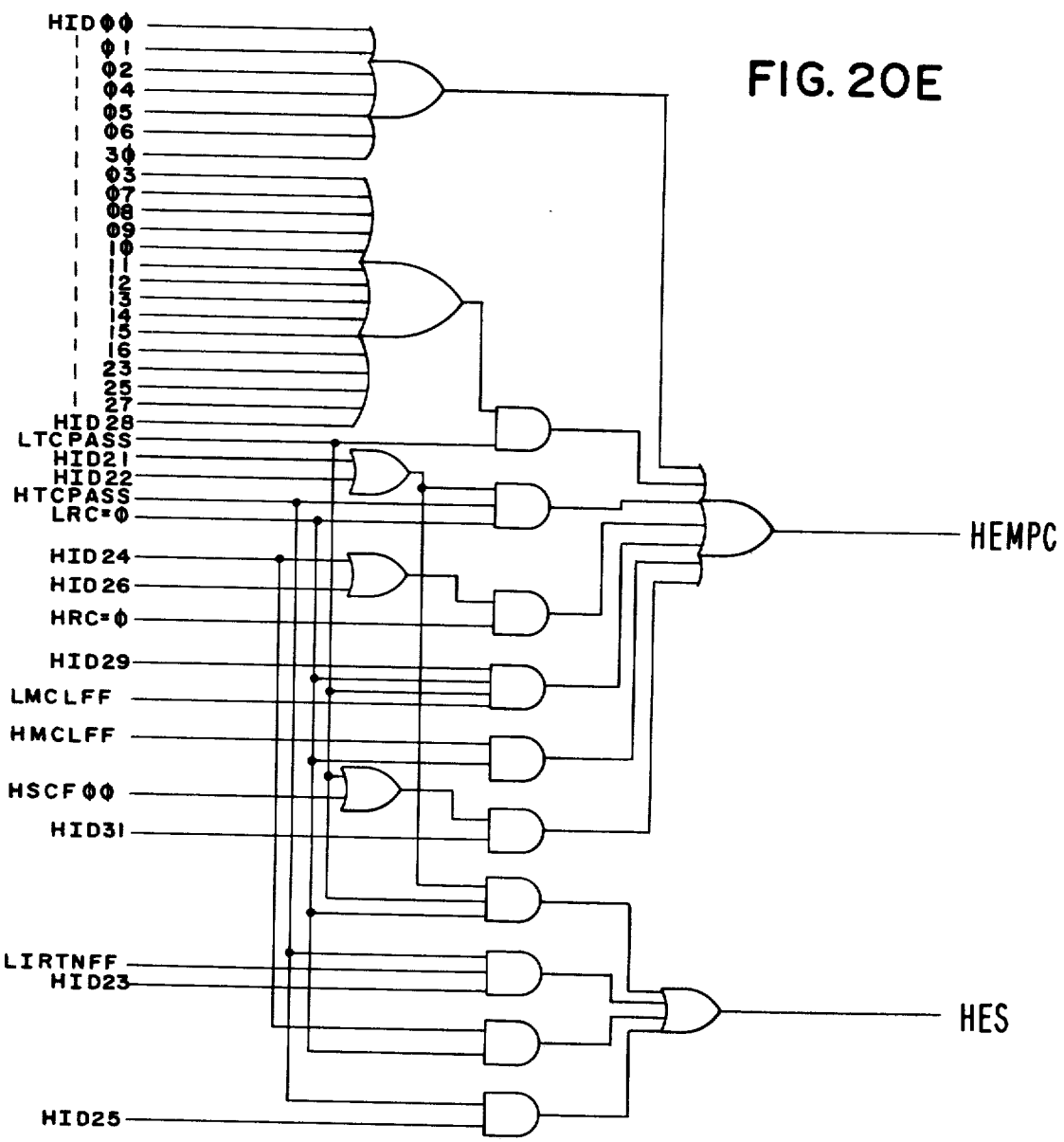
Figure 20E:
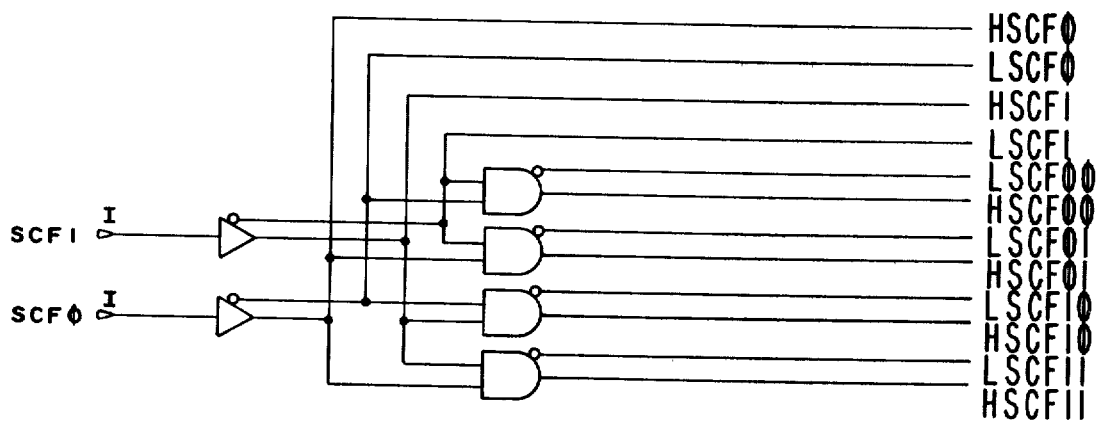
Figure 20F:
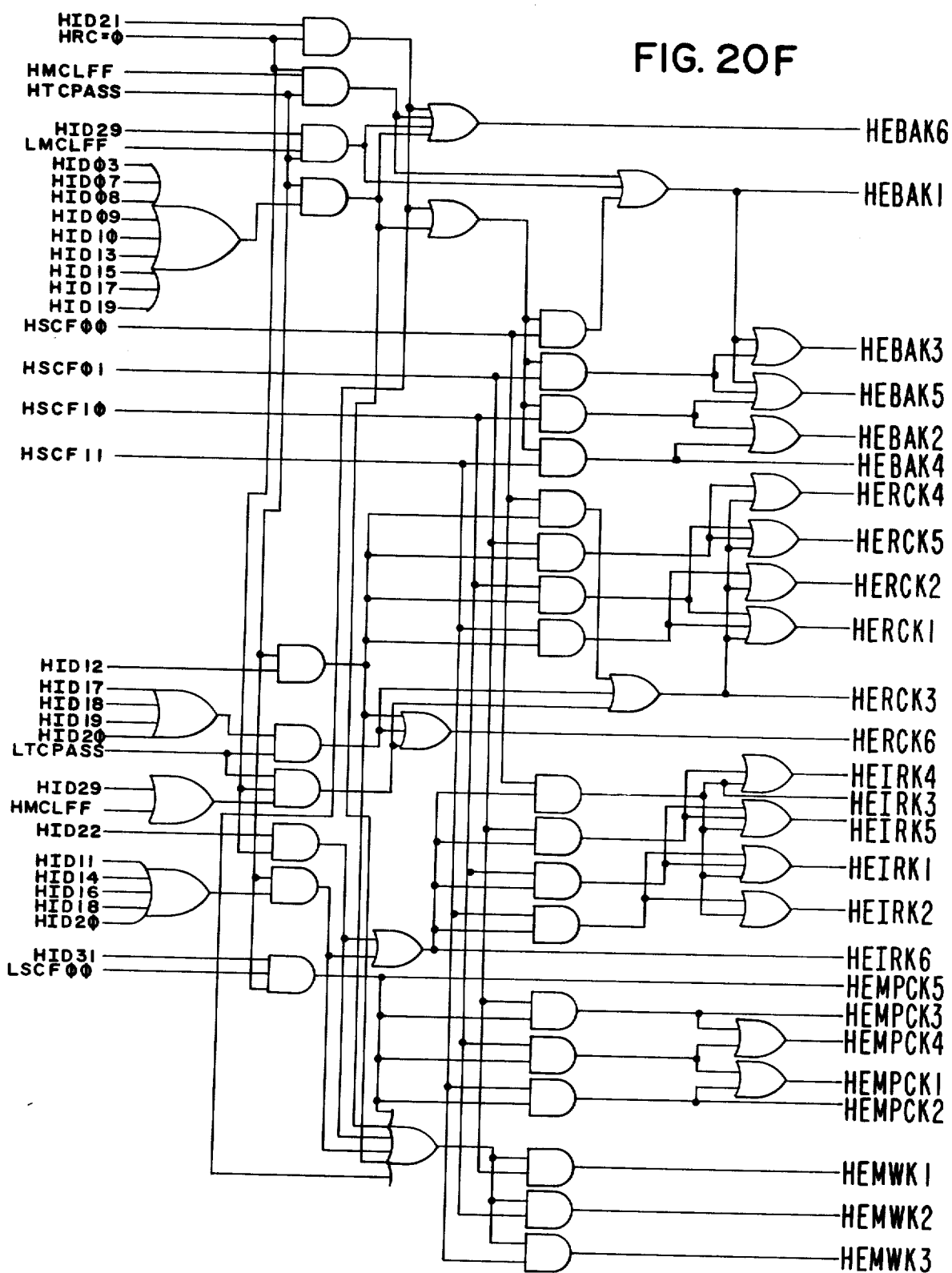

FIG. 18 is a schematic of one embodiment of a stack to BA buffer.

Figure 19:
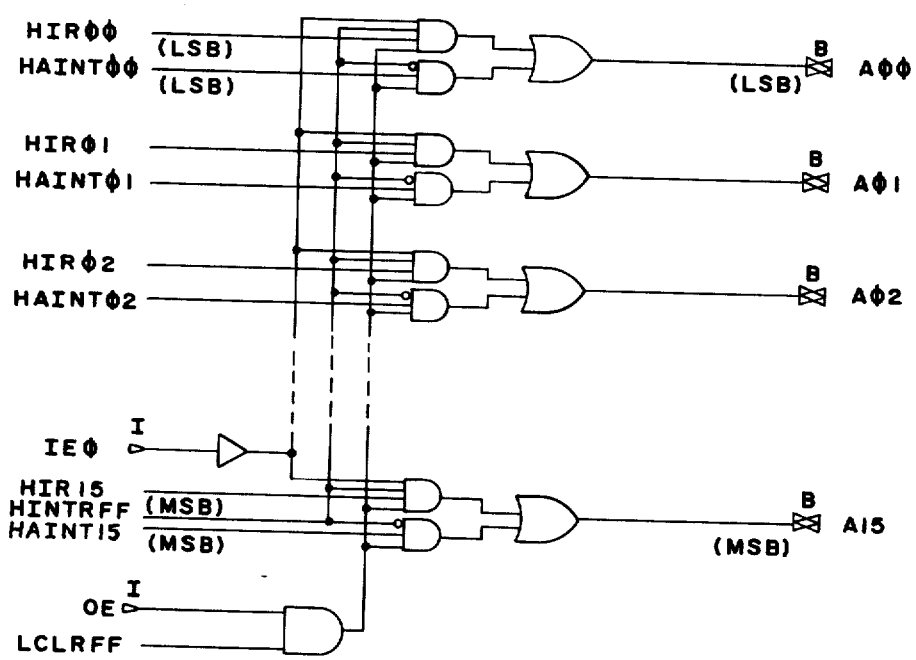
FIG. 19 is a schematic of one embodiment of an $A_{int}$ to $A_i$ buffer.

FIG. 19 is a schematic of one embodiment of an $A_{int}$ to $A_i$ buffer.

FIGS. 20A–20F are schematics of one embodiment of control logic.

SUMMARY

There has been described an improved microprogrammed apparatus and a microprogram sequencing unit which is capable of making decisions based on instructions and/or external conditions. The sequencer also provides storage for saving and returning to various states of execution of a microprogram in response to interrupts.

While the invention has been described with reference to a specific embodiment, the description is illustrative of the invention and is not to be construed as limiting the invention. Various modifications and implementations may occur to those skilled in the art without departing from the true spirit and scope of the invention as defined by the appended claims.

What is claimed is:

1. An interruptible microprogram sequencing unit for providing a sequence of microinstruction addresses to a control memory which contains a plurality of microinstructions for the operation of a microprogrammed apparatus, the microprogram sequencing unit comprising:
   (a) an address output for providing microinstruction addresses to the control memory,
   (b) an address bus connected to said address output such that a plurality of microinstruction addresses applied to said address bus are sequentially provided to said address output,
   (c) means connected to said address bus for applying said plurality of microinstruction addresses to said address bus,
   (d) an interrupt return register operably connected to said address bus for receiving a microtruction address from said address bus and storing said received microinstruction address, and
   (e) means connected to said address bus for interrupting said sequence of microinstruction addresses and effecting storage of a microinstruction address on said address bus in said interrupt return register.

2. An interruptible microprogram sequencing unit as defined by claim 1 and further including first address incrementing means including a microprogram counter and operably connected to said bus for incrementing addresses.

3. An interruptible microprogram sequencing unit as defined by claim 2 and further including second address incrementing means operably connected with said first address incrementing means and said bus for providing a skip address.

4. An interruptible microprogram sequencing unit as defined by claim 2 further including a multilevel storage means operably connected with said bus, said first address incrementing means, and said interrupt return register for storing a return address in response to multiple interrupts.

5. An interruptible microprogram sequencing unit as defined by claim 4 wherein said multilevel storage means includes status means for indicating overflow and underflow conditions.

6. An interruptible microprogram sequencing unit as defined by claim 4 wherein said means for applying externally supplied addresses to said bus includes an interrupt register for storing externally supplied addresses and operably connected to provide a stored address to said bus.

7. An interruptible microprogram sequencing unit as defined by claim 6 and further including means for receiving an interrupt address from said interrupt register and directly from an external address source.

8. An interruptible microprogram sequencing unit as defined by claim 7 and further including means for inhibiting an interrupt.

9. An interruptible microprogram sequencing unit as defined by claim 6 and further including means for connecting said interrupt register directly to said address output.

10. An interruptible microprogram sequencing unit as defined by claim 6 and further including register/counter means connected to said address bus for storing an address or for storing a decrementible count, said register/counter means including means for indicating a zero count.

11. An interruptible microprogram sequencing unit as defined by claim 10 and including means for loading a start address in said first address incrementing means and for loading a count in said register/counter means whereby a sequence of microinstructions are addressed.

12. An interruptible microprogram sequencing unit as defined by claim 11 and further including multiplexer means for selectively connecting said means for supplying externally supplied addresses, said interrupt register, and said register/counter means to said bus.

13. An interruptible microprogram sequencing unit as defined by claim 12 and further including means for connecting said multiplexer means to said multilevel storage means for storing addresses from said multiplexer means and means for connecting said multilevel storage means to said interrupt register and said register/counter means for restoring addresses.

14. An interruptible microprogram sequencing unit as defined by claim 13 and further including means for connecting said multilevel storage means to said means for applying externally supplied addresses whereby contents of said multilevel storage means can be transferred to external storage means.

15. An interruptible microprogram sequencing unit as defined by claims 1 or 13 and further including a repeat address register operably connected to said bus for storing an address on said bus and for supplying an address to said bus.

16. An interruptible microprogram sequencing unit as defined by claim 15 and further including multiway input means and multiplexer means responsive to source control field inputs for applying an address with offset to said bus.

17. An interruptible microprogram sequencing unit as defined by claim 16 wherein said bus comprises 16 bit lines whereby said unit can address 64K (K=1024) locations of memory.

18. An interruptible microprogram sequencing unit as defined by claim 16 and further including test input means connected to said address bus for providing microprogram test instruction addresses to said address bus, said test input means including enable, polarity control, and test condition inputs.

19. A microprogrammed apparatus comprising a plurality of data paths for manipulating data, a control memory connected to said data paths for sequentially providing a plurality of addressable microinstructions contained in said memory to said data paths for controlling said data paths, and a microprogram sequencing unit connected to said control memory for providing a sequence of microinstruction addresses to said control memory, said microinstruction sequencing unit including an address output for providing addressing microinstruction addresses to said control memory, an address bus connected to said address output such that a plurality of microinstruction addresses applied to said address bus are sequentially provided to said address output, means connected to said address bus for applying said plurality of microinstruction addresses to said address bus, an interrupt return register operably connected to said address bus for receiving a microinstruction address from said address bus and storing said received microinstruction address, and means connected to said address bus for interrupting said sequence of microinstruction addresses and effecting storage of a microinstruction address on said address bus in said interrupt return register.

20. A microprogrammed apparatus as defined by claim 19 wherein said microprogram sequencing unit further includes a first address incrementing means including a microprogram counter and operably connected to said bus for incrementing addresses.

21. A microprogrammed apparatus as defined by claim 20 wherein said microprogram sequencing unit further includes a second address incrementing means operably connected with said first address incrementing means and said bus for providing a skip address.

22. A microprogrammed apparatus as defined by claim 20 wherein said microprogram sequencing unit further includes a multilevel storage means operably connected with said bus, said first address incrementing means, and said interrupt return register for storing a return address in response to multiple interrupts.

23. A microprogrammed apparatus as defined by claim 22 wherein said microprogram sequencing unit further includes status means connected to said address bus for indicating overflow and underflow conditions in said multilevel storage means.

24. A microprogrammed apparatus as defined by claim 22 wherein said microprogram sequencing unit further includes an interrupt register for storing externally supplied addresses and operably connected to provide a stored address to said bus.

25. A microprogrammed apparatus as defined by claim 24 wherein said microprogram sequencing unit further includes means for receiving an interrupt address from said interrupt register and directly from an external address source.

26. A microprogrammed apparatus as defined by claim 25 wherein said microprogram sequencing unit further includes means for inhibiting an interrupt.

27. A microprogrammed apparatus as defined by claim 25 wherein said microprogram sequencing unit further includes means for connecting said interrupt register directly to said address output.

28. A microprogrammed apparatus as defined by claim 25 wherein said microprogram sequencing unit further includes register/counter means connected to said address bus for storing an address and for storing a decrementible count, said register/counter means including means for indicating a zero count.

29. A microprogrammed apparatus as defined by claim 28 wherein said microprogram sequencing unit further includes means for loading a start address in said first address incrementing means and for loading a count in said register/counter means whereby a sequence of microinstructions are addressed.

30. A microprogrammed apparatus as defined by claim 29 wherein said microprogram sequencing unit further includes multiplexer means for selectively connecting said means for supplying externally supplied addresses, said interrupt register, and said register/counter means to said bus.

31. A microprogrammed apparatus as defined by claim 30 wherein said microprogram sequencing unit further includes means for connecting said multiplexer means to said multilevel storage means for storing addresses from said multiplexer means and means for connecting said multilevel storage means to said interrupt register and said register/counter means for restoring addresses.

32. A microprogrammed apparatus as defined by claim 31 wherein said microprogram sequencing unit further includes means for connecting said multilevel storage means to said means for applying externally supplied addresses whereby contents of said multilevel storage means can be transferred to external storage means.

33. A microprogrammed apparatus as defined by claims 19 or 32 wherein said microprogram sequencing unit further includes a repeat address register operably connected to said bus for storing an address on said bus and for supplying an address to said bus.

34. A microprogrammed apparatus as defined by claim 33 wherein said microprogram sequencing unit further includes multiway input means and multiplexer means responsive to source control field inputs for applying an address with offset to said bus.

35. A microprogrammed apparatus as defined by claim 34 wherein said microprogram sequencing unit further includes 16 bit lines whereby said unit can address 64K locations of memory.

36. A microprogrammed apparatus as defined by claim 34 wherein said microprogram sequencing unit further includes test input means connected to said address bus for providing microprogram test instruction addresses to said address bus, said test input means including enable, polarity control, and test condition inputs.

* * * * *